(12) United States Patent
Okada et al.

(10) Patent No.: US 8,409,743 B2
(45) Date of Patent: Apr. 2, 2013

(54) BATTERY SYSTEM WITH BATTERY CELLS ARRANGED IN ARRAY ALIGNMENT

(75) Inventors: Wataru Okada, Hyogo (JP); Hideo Shimizu, Hyogo (JP); Shinsuke Nakamura, Hyogo (JP); Tomoyuki Omura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1096 days.

(21) Appl. No.: 12/292,806

(22) Filed: Nov. 26, 2008

(65) Prior Publication Data
US 2009/0142653 A1 Jun. 4, 2009

(30) Foreign Application Priority Data
Nov. 28, 2007 (JP) .................................. 2007-308092
Nov. 29, 2007 (JP) .................................. 2007-308998

(51) Int. Cl.
*H01M 10/50* (2006.01)
(52) U.S. Cl. .............. 429/120; 429/71; 429/96; 429/99; 429/151; 429/159
(58) Field of Classification Search ................... 429/62, 429/71, 72, 120, 96, 99, 151, 159
See application file for complete search history.

(56) References Cited

U.S. PATENT DOCUMENTS

| | | | | |
|---|---|---|---|---|
| 5,289,871 A | * | 3/1994 | Leidinger | 165/110 |
| 5,578,393 A | * | 11/1996 | Haskins | 429/120 |
| 5,678,760 A | | 10/1997 | Muso et al. | |
| 5,756,227 A | * | 5/1998 | Suzuki et al. | 429/62 |
| 6,512,347 B1 | * | 1/2003 | Hellmann et al. | 320/107 |
| 2005/0037251 A1 | * | 2/2005 | Horiuchi et al. | 429/30 |
| 2005/0089750 A1 | * | 4/2005 | Ng et al. | 429/120 |

(Continued)

FOREIGN PATENT DOCUMENTS

| | | |
|---|---|---|
| EP | 1 990 860 | 11/2008 |
| JP | 34-16929 | 10/1959 |

(Continued)

OTHER PUBLICATIONS

European Search Report (in English language) issued Apr. 4, 2009 in corresponding European Patent Application No. 08020558.

*Primary Examiner* — Ula C Ruddock
*Assistant Examiner* — Amanda Barrow
(74) *Attorney, Agent, or Firm* — Wenderoth, Lind & Ponack, LLP.

(57) ABSTRACT

A battery system includes a battery block, a cooling pipe, and a coolant feeding device. The battery block includes a plurality of rectangular batteries that have a width greater than a thickness and are securely arranged in array alignment by a battery holder. The cooling pipe cools the rectangular batteries of the battery block. The coolant feeding device feeds coolant to the cooling pipe. In the battery system, the cooling pipe is arranged on the surface of the battery block in a thermally-coupled state so that the rectangular batteries are cooled by the coolant, which is circulated through the cooling pipe.

19 Claims, 34 Drawing Sheets

U.S. PATENT DOCUMENTS

| | | | |
|---|---|---|---|
| 2005/0162829 A1* | 7/2005 | Aker et al. | 361/695 |
| 2005/0241812 A1* | 11/2005 | Malone et al. | 165/150 |
| 2006/0132101 A1* | 6/2006 | Ambrosio et al. | 320/150 |
| 2006/0246348 A1* | 11/2006 | Hamada et al. | 429/148 |
| 2006/0269810 A1* | 11/2006 | Hase et al. | 429/26 |
| 2007/0009787 A1* | 1/2007 | Straubel et al. | 429/99 |
| 2007/0082313 A1* | 4/2007 | Itakura et al. | 432/227 |
| 2007/0216371 A1* | 9/2007 | Yoon et al. | 320/150 |
| 2008/0305388 A1 | 12/2008 | Haussman | |
| 2010/0055547 A1* | 3/2010 | Nakamura | 429/71 |

FOREIGN PATENT DOCUMENTS

| | | |
|---|---|---|
| JP | 51-84041 | 7/1976 |
| JP | 7-6796 | 1/1995 |
| JP | 11-307139 | 11/1999 |
| JP | 2000-348781 | 12/2000 |
| JP | 2007-12486 | 1/2007 |

* cited by examiner

BATTERY SYSTEM WITH BATTERY CELLS ARRANGED IN ARRAY ALIGNMENT

BACKGROUND OF THE INVENTION

1. Field of the Invention

The present invention relates to a battery system that includes a battery block that includes a plurality of rectangular batteries arranged in array alignment and cools the battery block with coolant, and in particular to a battery system suitable for a power supply for vehicles such as hybrid cars.

2. Description of the Related Art

In the case of a battery system with a number of rectangular batteries, since the output voltage of the battery system can be high, the battery system is charged/discharged with a large amount of current. In particular, in the case of a battery system used as a power supply device for a vehicle, the battery system is discharged with a large amount of current when the vehicle is accelerating, and the battery system is charged with a large amount of current during regenerative braking or the like. Since the temperature of battery systems rises greatly when the battery systems are charged/discharged with a large amount of current, such battery systems are forcedly cooled by air or cooled. In the case where a battery system is cooled by air, its cooling structure can be simple. However, since the thermal capacity of air is small, it is difficult for air to quickly cool the battery system in the state where its batteries generate a significantly large amount of heat. Also, in this case, there is a disadvantage in that, if the amount of air flow is increased to increase the amount of battery heat reduction, the noise level of the cooling structure increases. In the case of a cooling structure that cools the battery system by forcedly flowing air, there is a disadvantage in that dust in air accumulates on the surface of the battery system so that the cooling efficiency of the cooling system decreases with time. These disadvantages can be eliminated by a cooling structure disclosed in Japanese Publication of Examined Utility Model Application S34-16929 that includes a cooling pipe that is arranged to be thermally coupled to batteries and is cooled by coolant.

Japanese Publication of Examined Utility Model Application S34-16929 discloses the cooling pipe that is arranged between the batteries, which have a rectangular shape and are aligned with each other. The cooling pipe is cooled by cooling water that is fed to the cooling pipe to cool the rectangular batteries. This structure can efficiently cool the rectangular batteries with the cooling water, however, since the cooling pipe is arranged between a number of rectangular batteries, in the case of a battery system with a number of aligned rectangular batteries, the arrangement of the cooling pipe is very complicated.

The present invention has been developed for solving the disadvantage. It is an important object of the present invention is to provide a battery system that can efficiently cool rectangular batteries with a cooling pipe that can be simply arranged.

SUMMARY OF THE INVENTION

A battery system according to the present invention includes a battery block, cooling pipe, and a coolant feeding device. The battery block includes a plurality of rectangular batteries that have a width greater than a thickness and are securely arranged in array alignment by a battery holder. The cooling pipe cools the rectangular batteries of the battery block. The coolant feeding device feeds coolant to the cooling pipe. The cooling pipe is arranged on the surface of the battery block in a thermally-coupled state so that the rectangular batteries are cooled by the coolant, which is circulated through the cooling pipe.

The aforementioned battery system can efficiently cool the rectangular batteries with the cooling pipe and can be simply arranged. Particularly in the case where a battery system includes a number of rectangular batteries that are arranged in array alignment, the aforementioned battery system can efficiently and quietly cool the rectangular batteries with the simple arrangement. The reason is that the aforementioned battery system includes the cooling pipe arranged on the surface of the battery block in a thermally-coupled state so that the rectangular batteries are cooled by the coolant, which is circulated through the cooling pipe.

Particularly, in an aspect of the battery system according to the present invention, in which the cooling pipe has parallel piping portions that are arranged in parallel to the rectangular batteries so that the parallel piping portions cool the rectangular batteries, the battery system that can more efficiently cool the rectangular batteries with the cooling pipe. The reason is that the parallel piping portions that are arranged in parallel to the rectangular batteries are arranged to be efficiently thermally coupled to the rectangular batteries.

Also, in an aspect of the battery system according to the present invention in which the parallel piping portions of the cooling pipe are arranged on the bottom surface of the battery block and extend right under the rectangular batteries, the parallel piping portions can most efficiently cool the rectangular batteries from the bottom side.

Also, in an aspect of the battery system according to the present invention in which each of the parallel piping portions of the cooling pipe is arranged on the bottom surface of the battery block and extends along the boundary between adjacent rectangular batteries to contact the adjacent rectangular batteries, the cooling pipe can effectively cool and firmly bear the adjacent rectangular batteries from the lower side.

Also, in an aspect of the battery system according to the present invention in which the parallel piping portions of the cooling pipe are arranged more tightly in the middle of the battery block than in the ends of the battery block, it is possible to more efficiently cool the rectangular batteries in the middle of the battery block. Particularly, in the case where this configuration is used in a battery system in that the temperature of the middle of a battery block is likely to rise higher, rectangular batteries can be uniformly cooled.

Also, in an aspect of the battery system according to the present invention in which the parallel piping portions of the cooling pipe are arranged more tightly in the ends of the battery block than in the middle of the battery block, it is possible to more efficiently cool the rectangular batteries that are arranged in array alignment in the ends of the battery block. Particularly, in the case where this configuration is used in a battery system in which the temperature of rectangular batteries in the ends of a battery block is likely to rise higher, rectangular batteries can be uniformly cooled.

Also, in an aspect of the battery system according to the present invention in which the cooling pipe is directly thermally coupled to the rectangular batteries, the cooling pipe can efficiently cool the rectangular batteries.

Also, in an aspect of the battery system according to the present invention in which the parallel piping portions of the cooling pipe have a flat part in cross-section and the flat part is thermally coupled to the rectangular batteries, thermally-coupled area between the cooling pipe and the rectangular batteries can be large, and as a result the cooling pipe can efficiently cool the rectangular batteries.

Furthermore, in another aspect of a battery system according to the present invention that has the following configuration, a cooling pipe that is arranged under a battery block can be thin but to improve thermal efficiency and additionally it is possible to effectively prevent damage to the cooling pipe due to the weight of battery block.

In the structure where coolant cools a battery, ideally, the coolant is in direct contact with the battery. However, since such an ideal structure limits the arrangement of battery and coolant, its applicability is limited. For this reason, generally, cooling structures include a cooling pipe through which coolant is circulated so that the cooling pipe cools a battery. In such cooling structures, since cooling pipes have heat resistance, which reduces thermal conduction, the cooling pipes reduce the cooling efficiency of coolant for batteries. If a cooling pipe is thin in order to reduce the heat resistance of the pipe, the strength of the cooling pipe decreases. Particularly, in the structure where a cooling pipe is arranged under the lower surface of a battery block, since the weight of the battery block is applied onto the cooling pipe, sufficient strength is required for the cooling pipe. In the case where a battery system includes a battery block that includes a battery array of a number of rectangular batteries and cools the battery block with coolant, this type of battery system is suitable for a high-power battery system. In this case, the battery block will be heavy. A cooling pipe that is arranged under the heavy battery block is likely to be damaged by the heavy weight of the battery block. Particularly, in the case of a battery system that is used in a vibration environment such as in a vehicle, the aforementioned type of battery system has a disadvantage in that a heavy battery block is more likely to cause damage such as deformation of the cooling pipe. If the thickness of the cooling pipe is increased to avoid this disadvantage, its heat resistance increases, and thus its cooling efficiency decreases. For this reason, in the case where a battery system includes a cooling pipe that is arranged under the lower surface of a battery block, it is difficult to reduce the thickness of the cooling pipe. Accordingly, the cooling pipe has large heat resistance. As a result, the battery system has a disadvantage in that the cooling efficiency of coolant decreases. The battery system according to the present invention that has the following configuration can solve the aforementioned disadvantages. The battery system includes a battery block, cooling pipe, and a coolant feeding device. The battery block includes a plurality of rectangular batteries that are securely arranged in array alignment by a battery holder. The cooling pipe is arranged in the bottom of the battery block, and cools the battery block from the bottom side. The coolant feeding device feeds coolant to the cooling pipe. The cooling pipe includes a serpentine region that includes a plurality of parallel piping portions, and U-bent portions. The plurality of parallel piping portions are arranged in parallel to each other in the horizontal plane. The ends of the plurality of parallel piping portions are coupled by the U-bent portions. In this battery system, the serpentine region is arranged in the lower surface of the battery block, and the U-bent portions are arranged in the ends of the lower surface of the battery block The aforementioned battery system has a feature that can efficiently cool the rectangular batteries by the cooling pipe that can be simply arranged. Particularly in the case where a battery system includes a number of rectangular batteries that are arranged in array alignment, the aforementioned battery system has a feature that can efficiently and quietly cool the rectangular batteries by the simple arrangement. The reason is that the aforementioned battery system includes the cooling pipe that is arranged under the battery block so that the rectangular batteries are cooled by the coolant.

In addition to these features, the aforementioned battery system has a feature in that the cooling pipe can be thin but can efficiently cool the batteries by the coolant, and additionally can prevent damage to the cooling pipe caused by the weight of the battery block. The reason is that the cooling pipe includes the serpentine region that includes the plurality of parallel piping portions and the U-bent portions that couple the ends of the plurality of parallel piping portions, the plurality of parallel piping portions being arranged in parallel to each other in the horizontal plane, and the serpentine region is arranged in the lower surface of the battery block, the U-bent portions being arranged in the ends of the lower surface of the battery block. Since the U-bent portions in the ends of the battery block are arranged more tightly as compared with the parallel piping portions, the bearing capability of the U-bent portions can be large. Accordingly, the U-bent portions can sufficiently strongly bear a heavy battery block. This allows a cooling pipe to bear the battery block even in the case where the cooling pipe is thin. In this case, the heat resistance of the cooling pipe can be small, and as a result the cooling efficiency of the cooling pipe can be high. Particularly, in the case where the battery block is rolled when vibrated, the structure that can firmly bear the ends of the battery block by the U-bent portions of the cooling pipe has a feature in that that the cooling pipe can then bear the battery block without being damaged even if the cooling pipe is thin and has small heat resistance in the state where the battery block is vibrated.

Also, in an aspect of the battery system according to the present invention in which the parallel piping portions of the cooling pipe are more tightly arranged in the outlet side of the coolant than the inlet side of the coolant, it is possible to efficiently cool the battery block at the outlet side of the coolant where the temperature of the coolant is likely to be higher, and as a result it is possible to uniformly cool the entire battery block.

Also, in an aspect of the battery system according to the present invention in which the battery block includes a plurality of battery units, the plurality of battery units being aligned from the inlet side to the outlet side of the coolant, and the parallel piping portions of the cooling pipe that are arranged in the battery unit in the outlet side of the colorant are arranged more tightly than the parallel piping portions of the cooling pipe that are arranged in the battery unit on the colorant inlet side, it is possible to efficiently cool the battery unit in the outlet side of the coolant, and as a result it is possible to uniformly cool the entire battery block that includes a plurality of battery units.

The battery system according to the present invention can be used as an electric vehicle power supply. Also, the battery system according to the present invention can be used as a hybrid car power supply.

Also, the rectangular batteries of the battery system according to the present invention can be lithium-ion rechargeable batteries. Also, the rectangular batteries of the battery system according to the present invention can be nickel-hydrogen batteries.

The battery block of the battery system according to the present invention can include rectangular batteries that are securely arranged in array alignment by a battery holder.

An exterior case of the rectangular battery and the cooling pipe of the battery system according to the present invention can be made of metal, and the exterior case of the rectangular battery and the cooling pipe can be insulated from each other.

The cooling pipe of the battery system according to the present invention can be an aluminum pipe. Also, the cooling pipe of the battery system according to the present invention can be a copper pipe.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
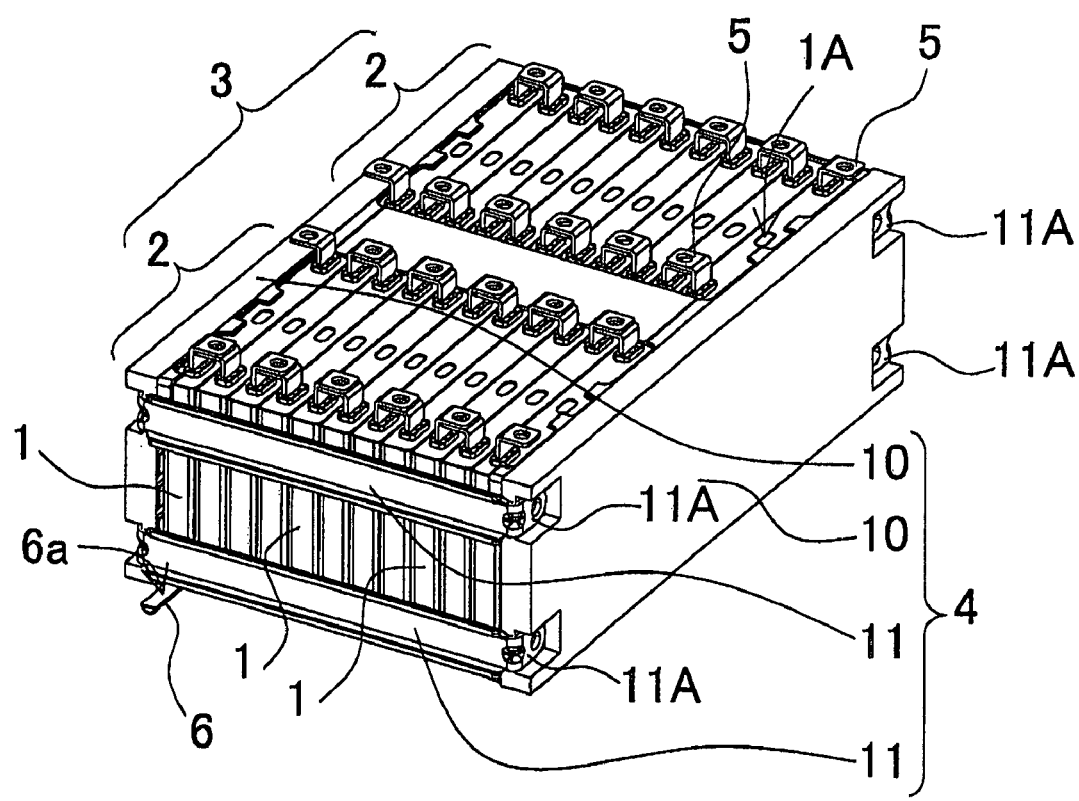
FIG. 1 is a schematic view showing the structure of a battery system according to a first embodiment of the present invention.
Figure 2:
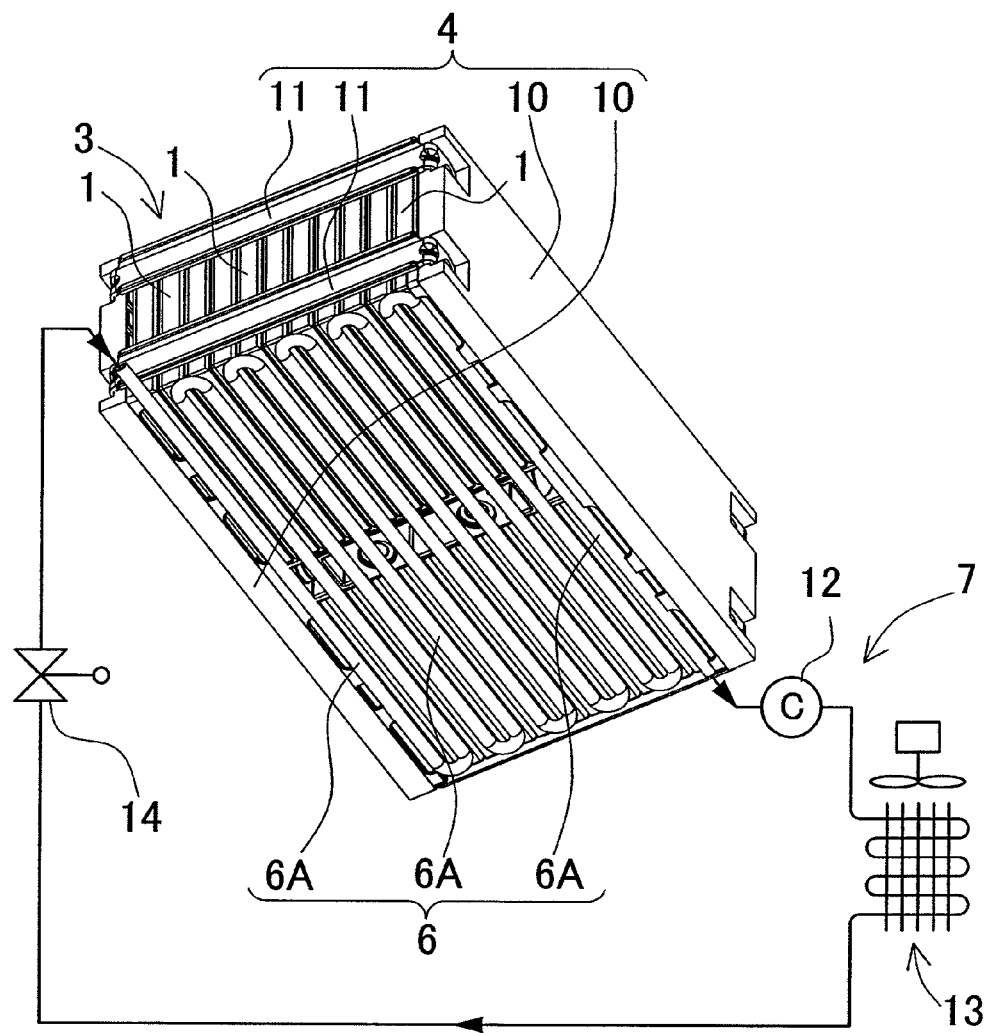
FIG. 2 is a perspective bottom view of the battery system shown in FIG. 1.
Figure 3:
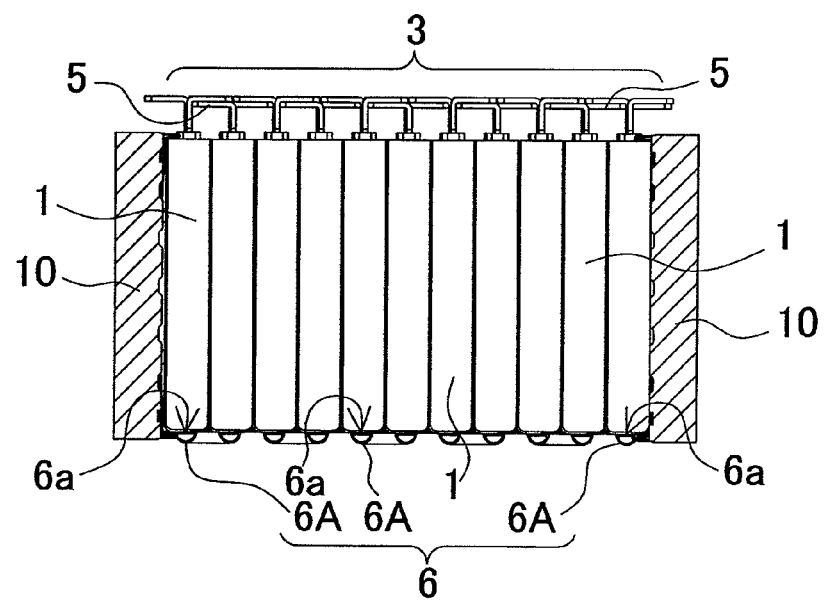
FIG. 3 is a transverse vertical cross-sectional view of the battery system shown in FIG. 1.
Figure 4:
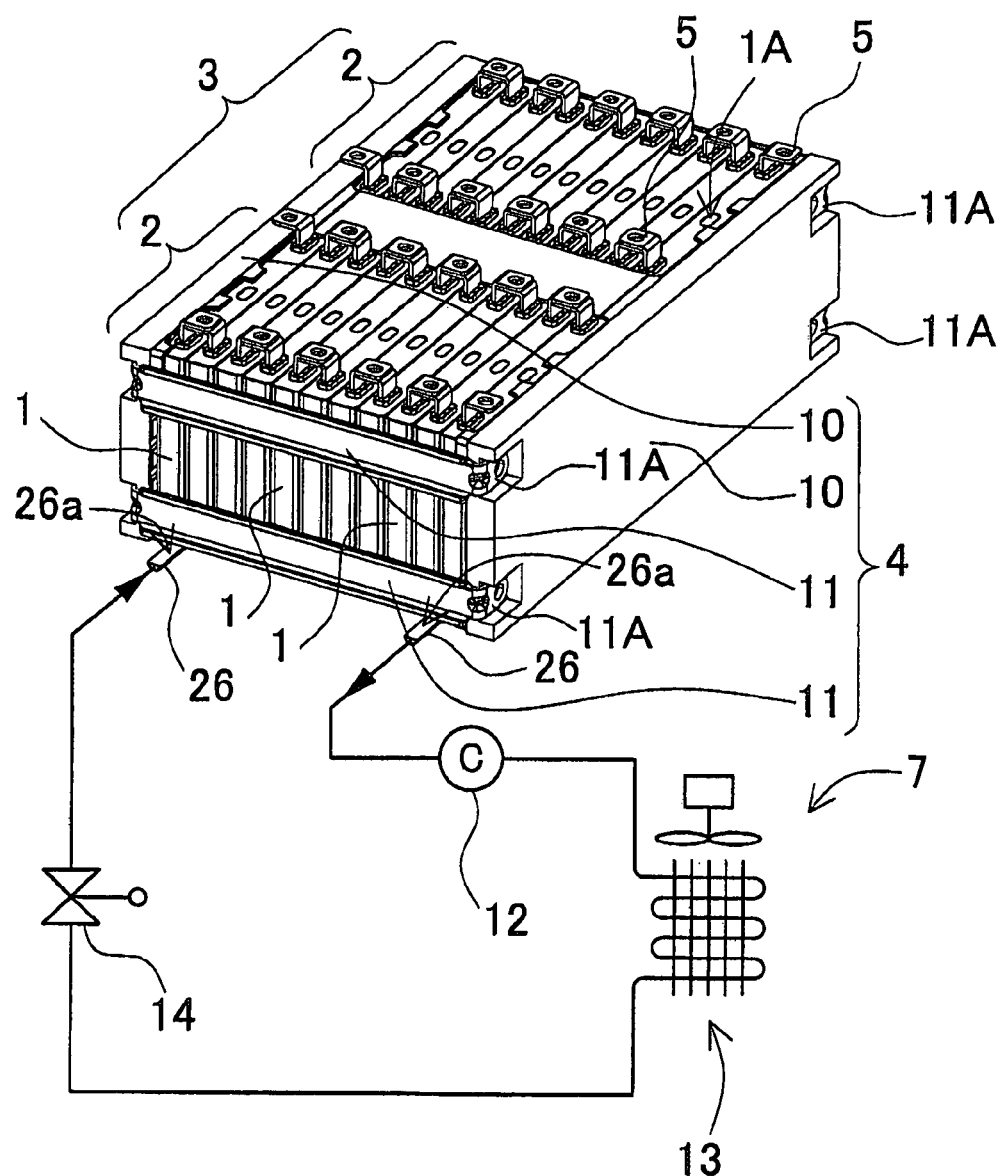
FIG. 4 is a schematic view showing the structure of a battery system according to a second embodiment of the present invention.
Figure 5:
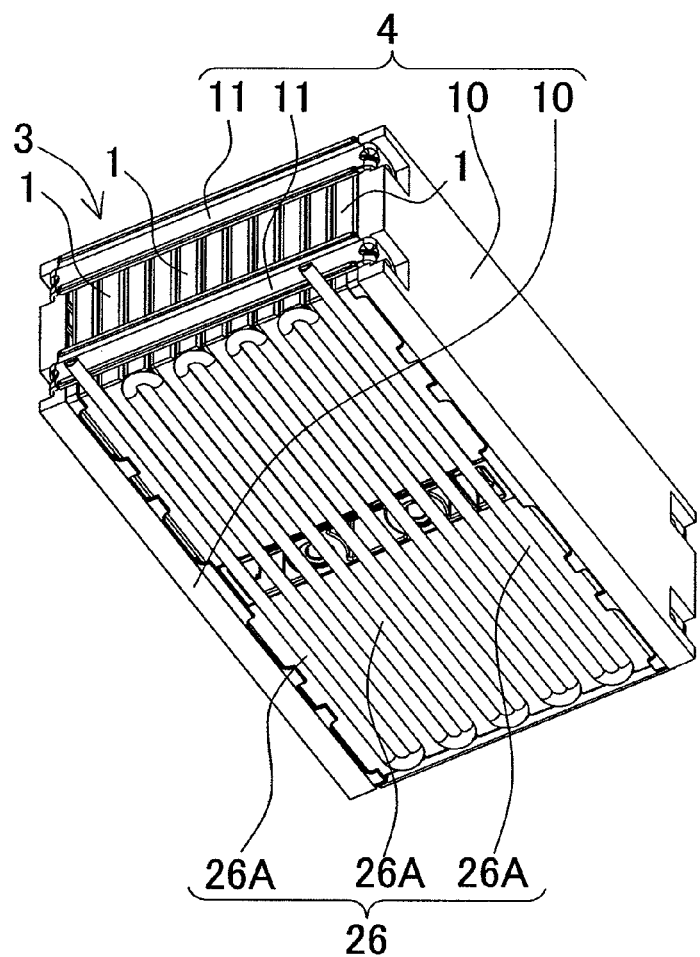
FIG. 5 is a perspective bottom view of the battery system shown in FIG. 4.
Figure 6:
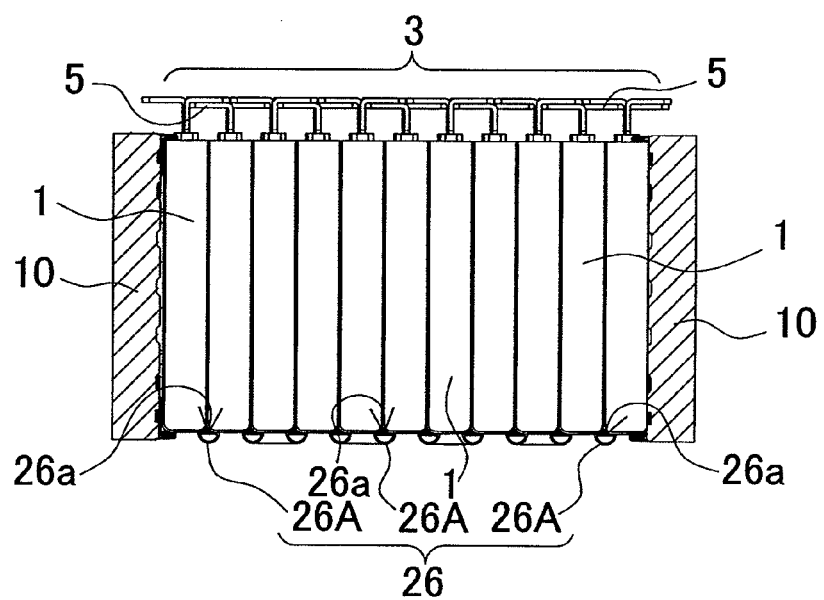
FIG. 6 is a transverse vertical cross-sectional view of the battery system shown in FIG. 4.
Figure 7:
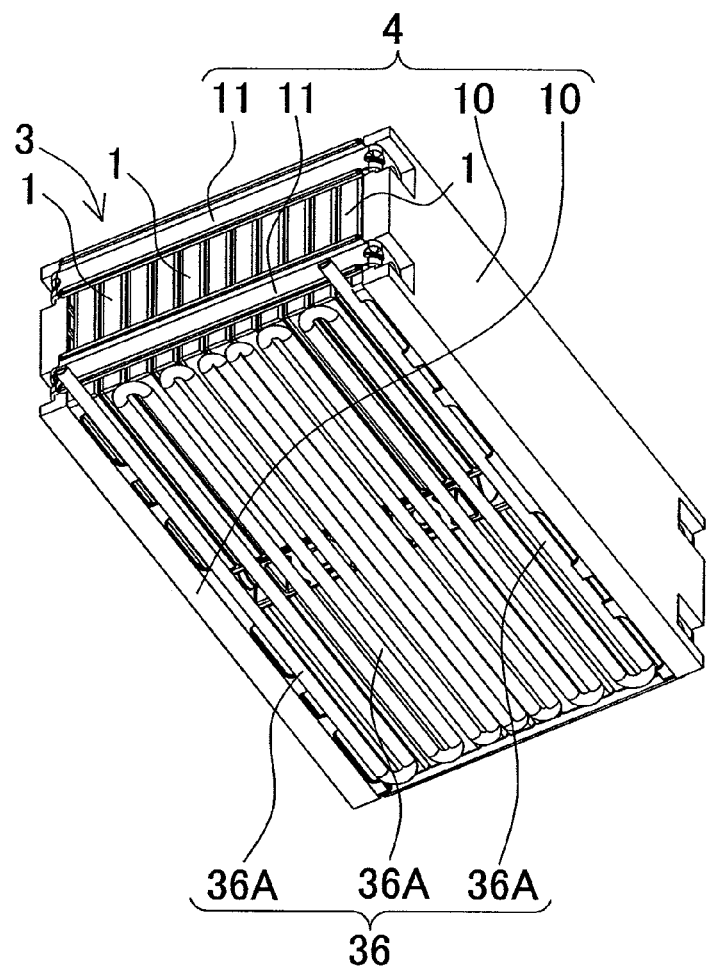
FIG. 7 is a bottom perspective view of a battery system according to a third embodiment of the present invention.
Figure 8:
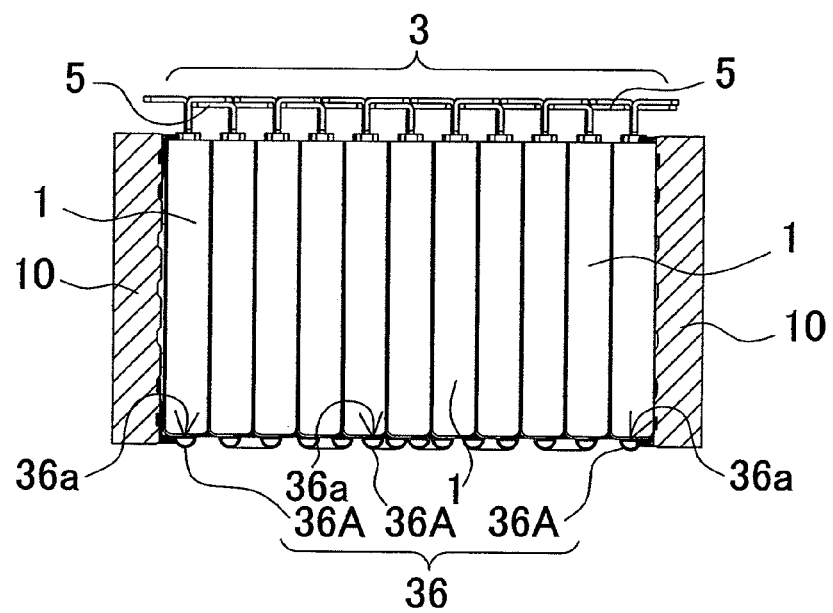
FIG. 8 is a transverse vertical cross-sectional view of the battery system shown in FIG. 7.
Figure 9:
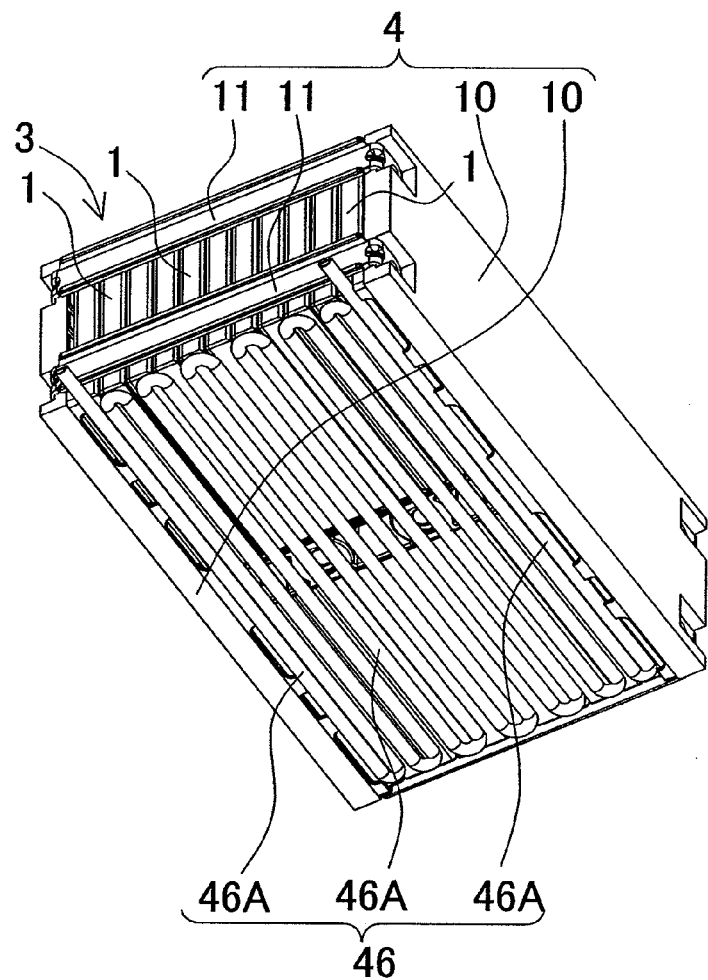
FIG. 9 is a bottom perspective view of a battery system according to a fourth embodiment of the present invention.
Figure 10:
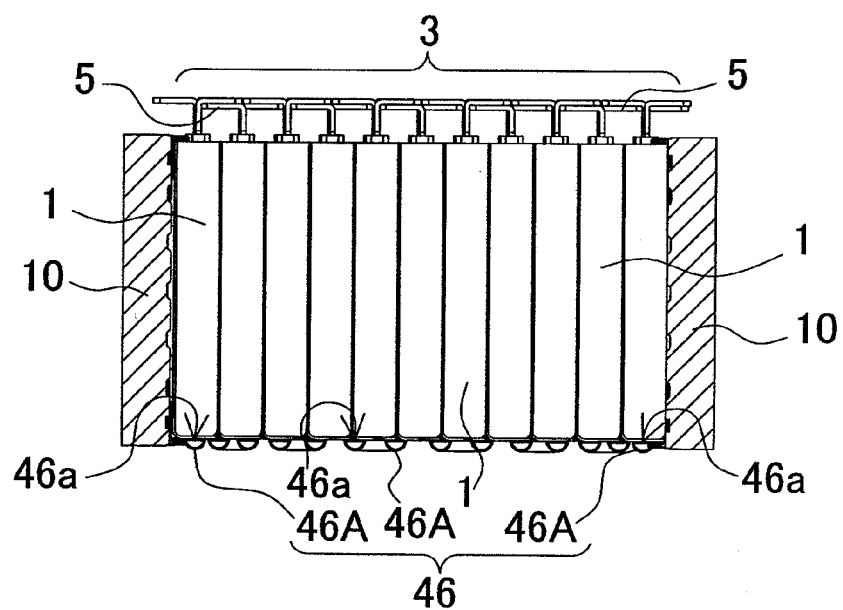
FIG. 10 is a transverse vertical cross-sectional view of the battery system shown in FIG. 9.
Figure 11:
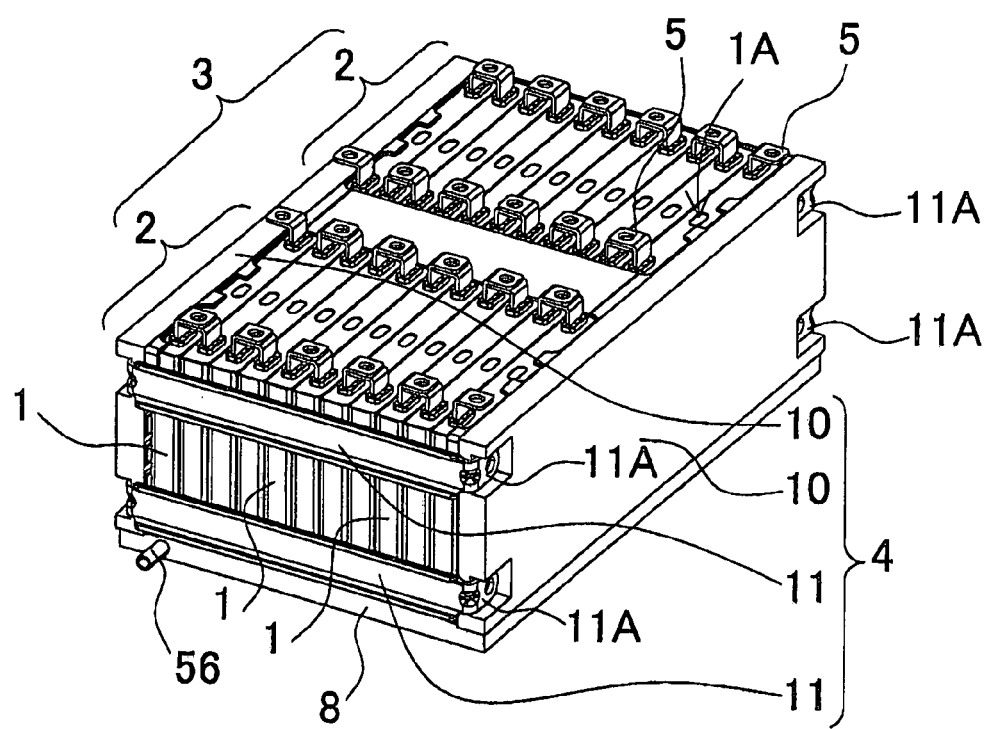
FIG. 11 is a schematic view showing the structure of a battery system according to a fifth embodiment of the present invention.
Figure 12:
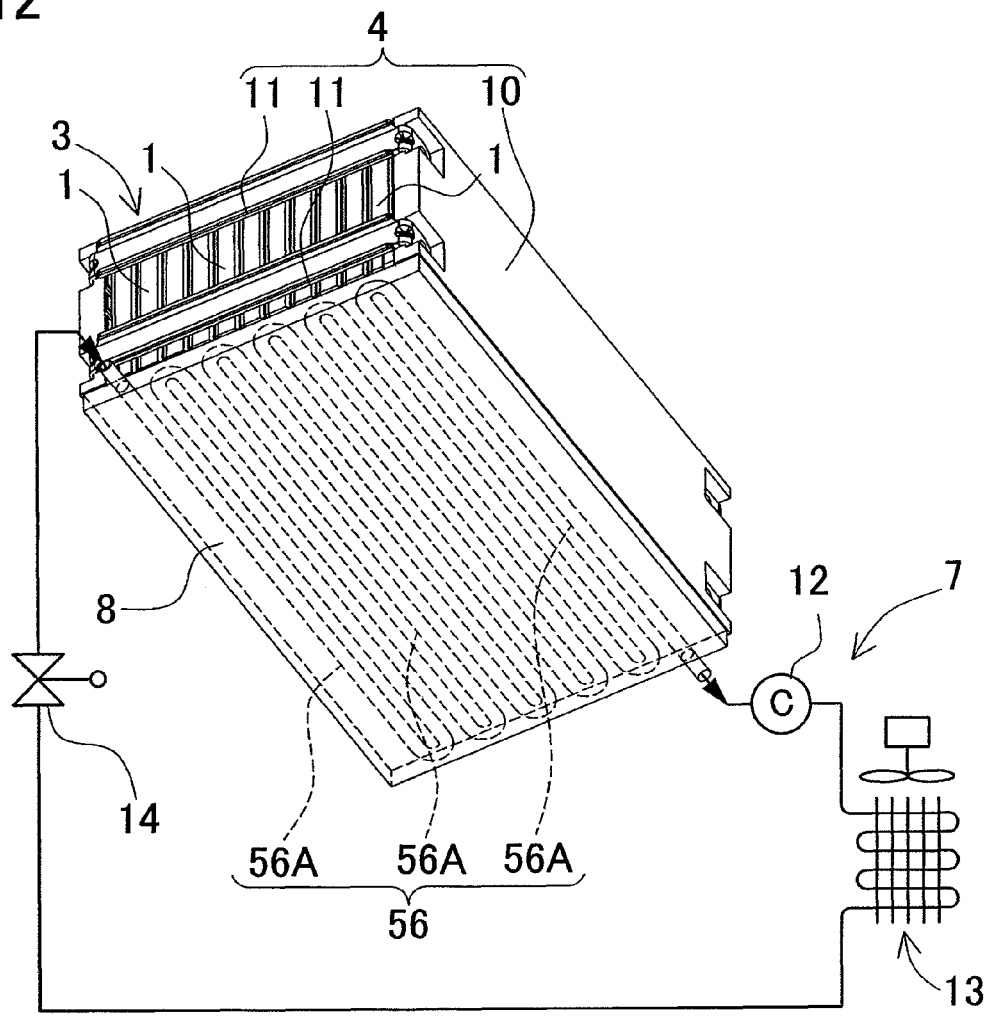
FIG. 12 is a perspective bottom view of the battery system shown in FIG. 11.
Figure 13:
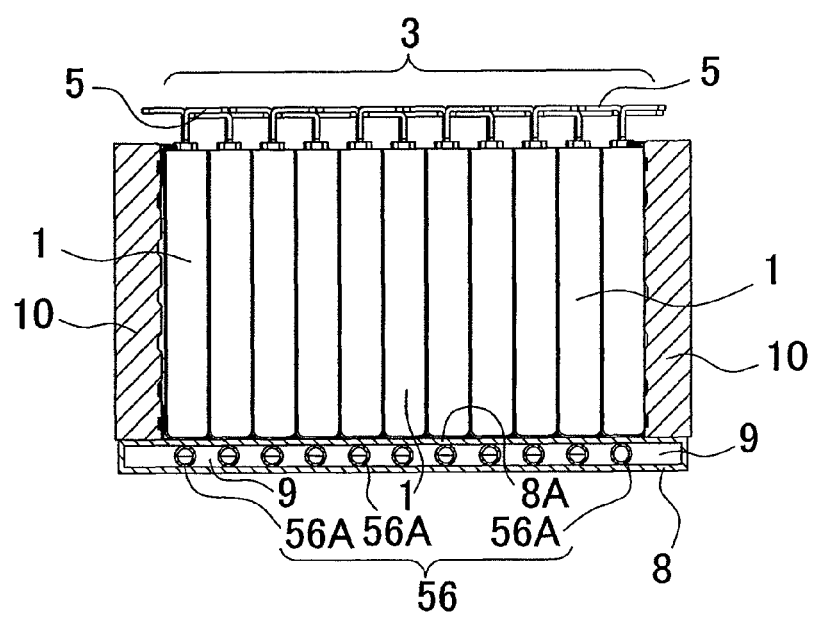
FIG. 13 is a transverse vertical cross-sectional view of the battery system shown in FIG. 11.
Figure 14:
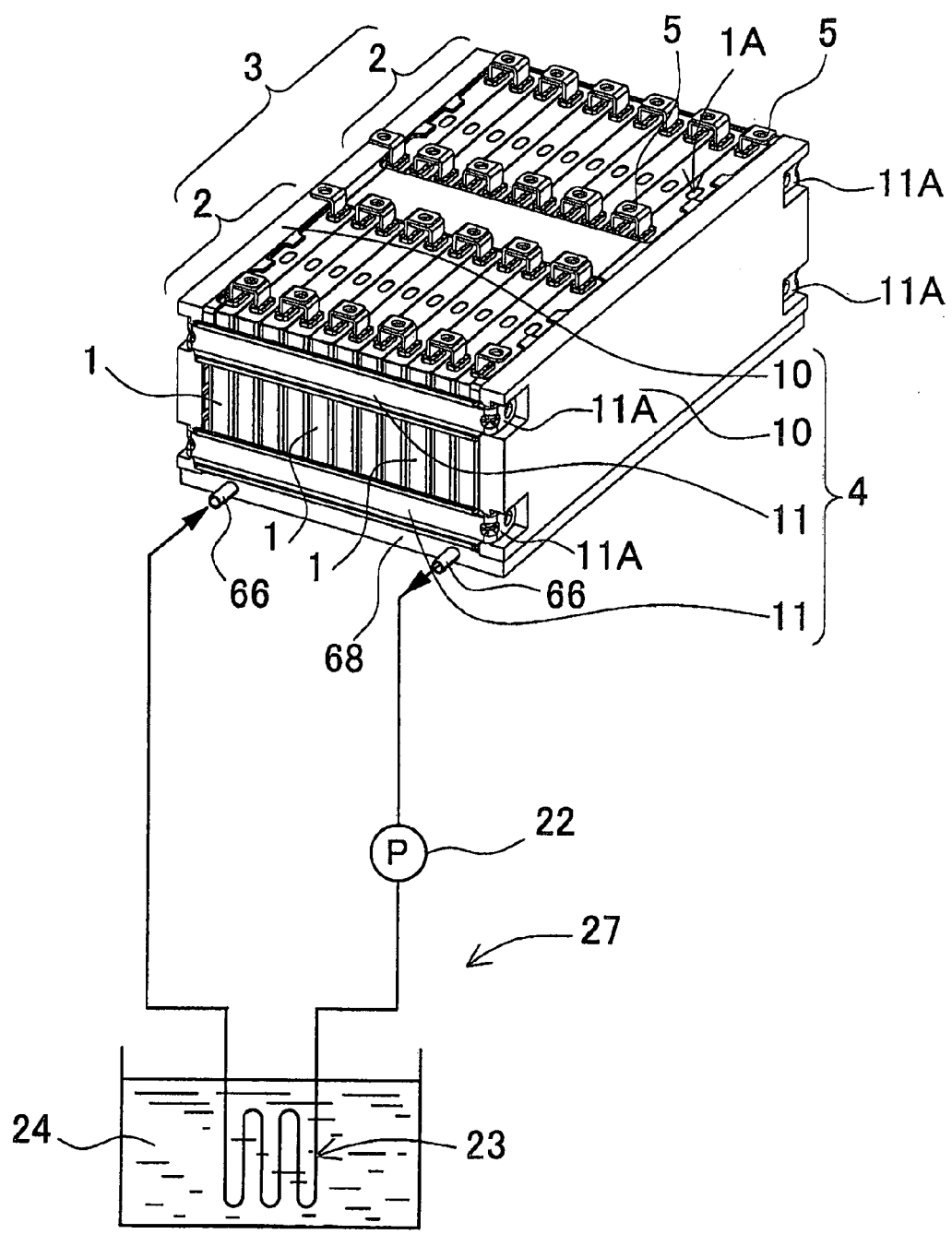
FIG. 14 is a schematic view showing the structure of a battery system according to a sixth embodiment of the present invention.
Figure 15:
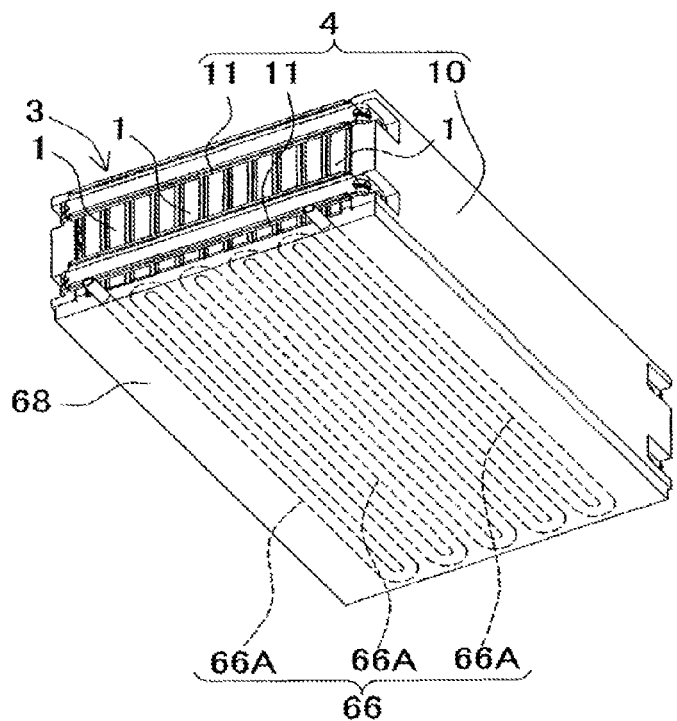
FIG. 15 is a perspective bottom view of the battery system shown in FIG. 14.
Figure 16:
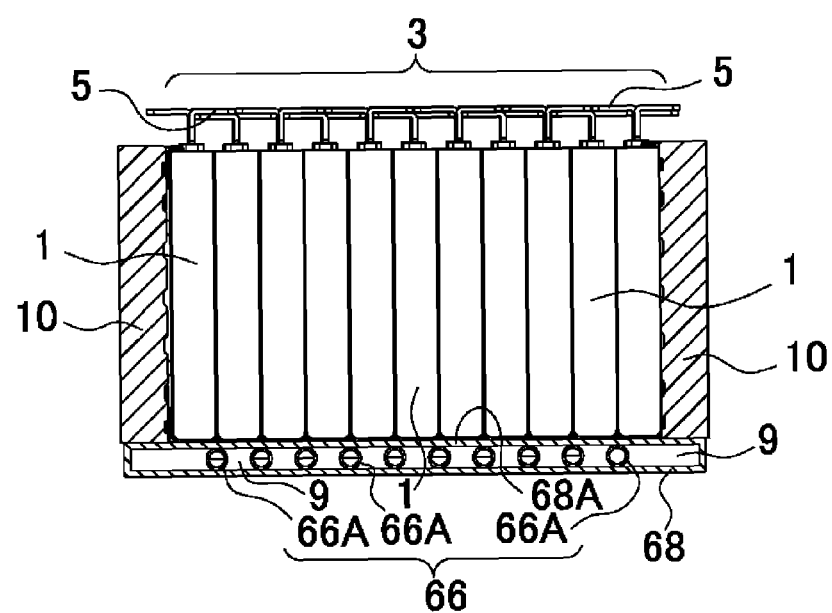
FIG. 16 is a transverse vertical cross-sectional view of the battery system shown in FIG. 14.
Figure 17:
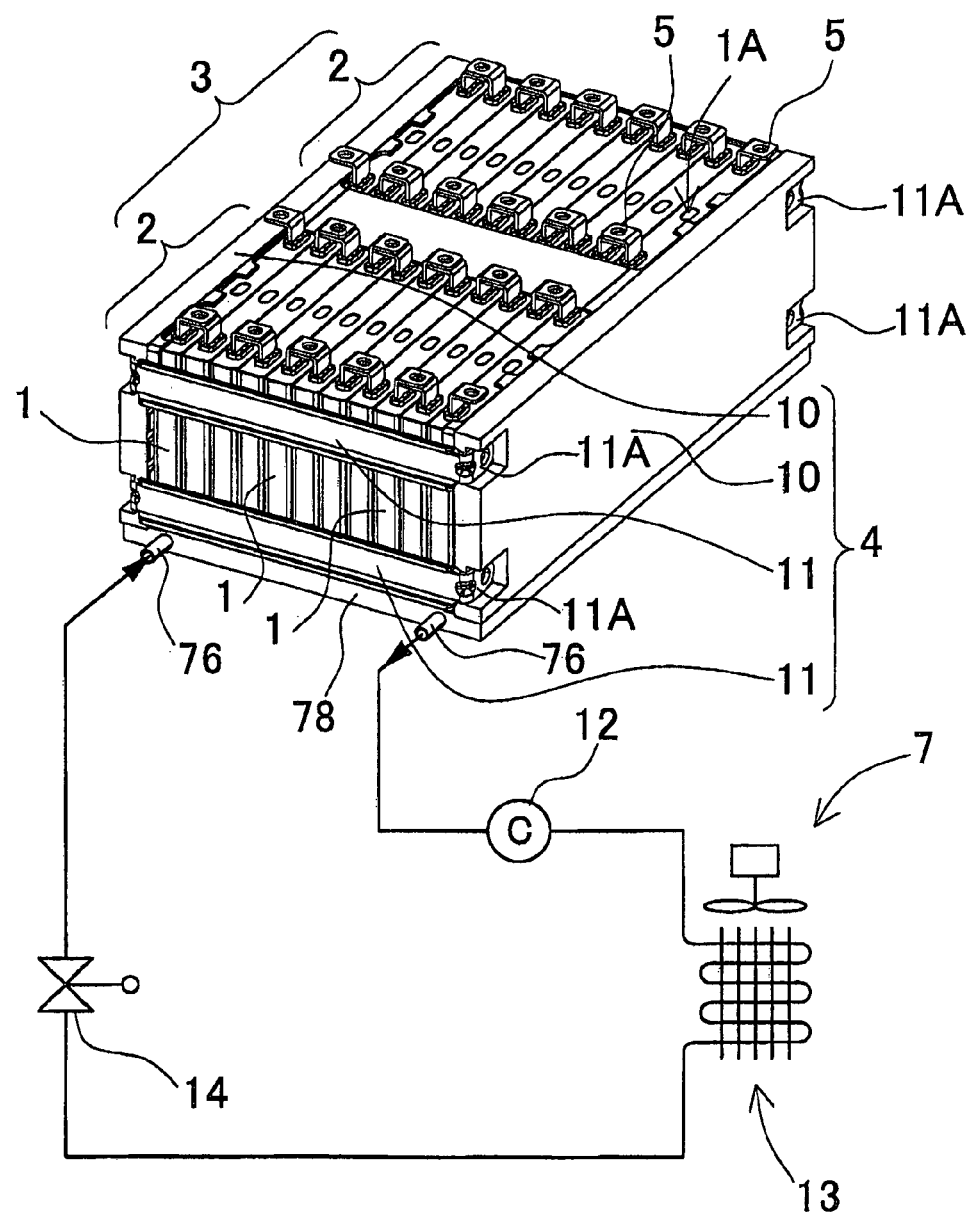
FIG. 17 is a schematic view showing the structure of a battery system according to a seventh embodiment of the present invention.
Figure 18:
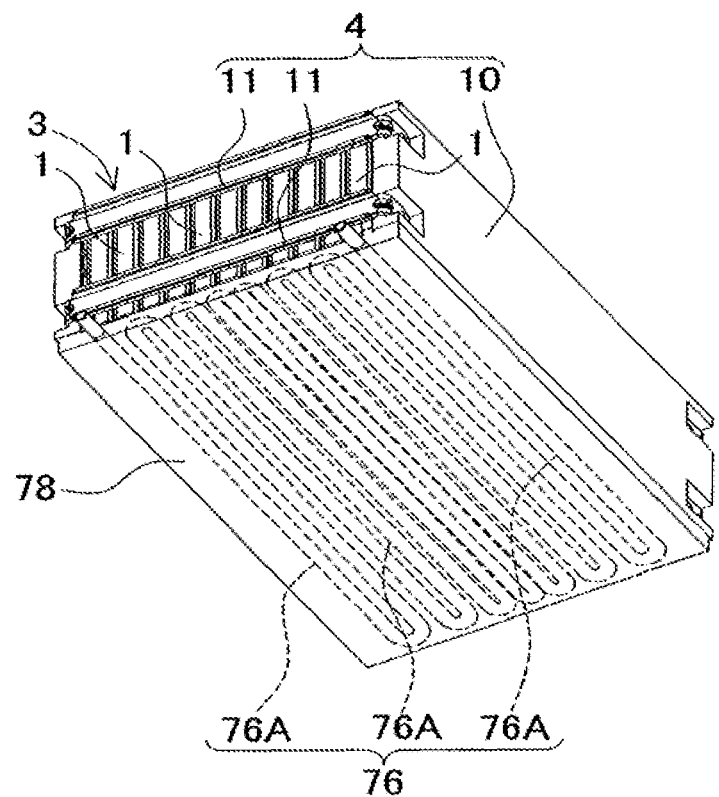
FIG. 18 is a perspective bottom view of the battery system shown in FIG. 17.
Figure 19:
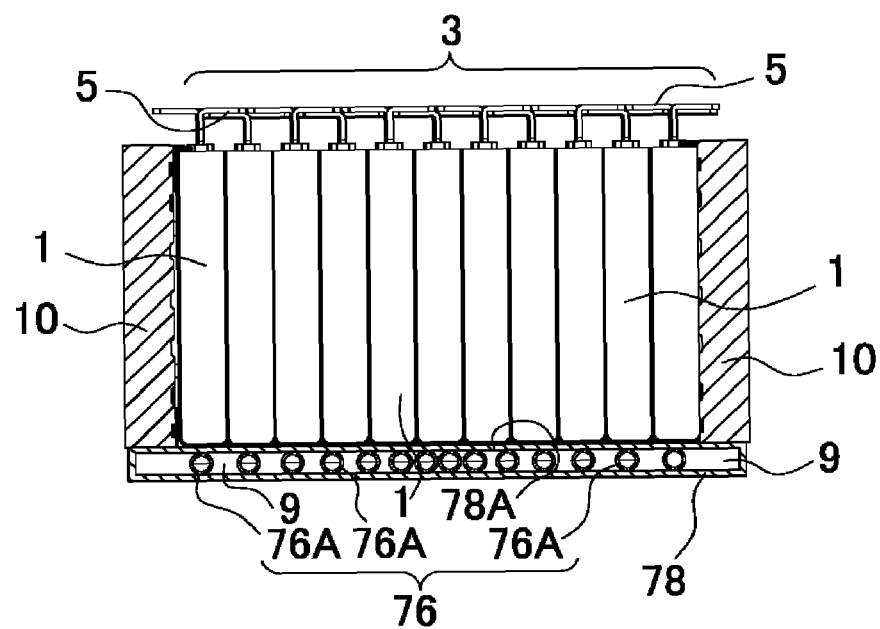
FIG. 19 is a transverse vertical cross-sectional view of the battery system shown in FIG. 17.
Figure 20:
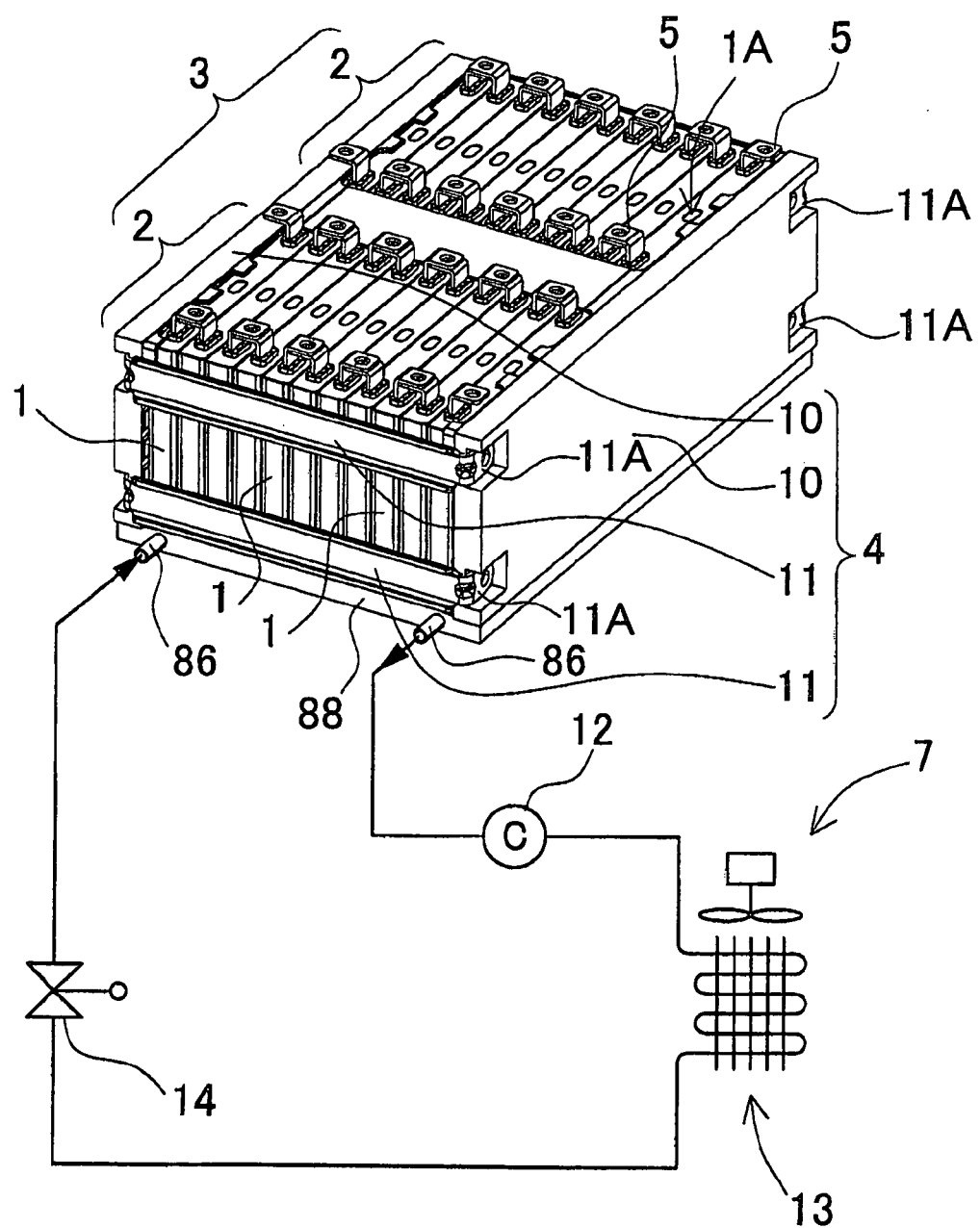
FIG. 20 is a schematic view showing the structure of a battery system according to an eighth embodiment of the present invention.
Figure 21:
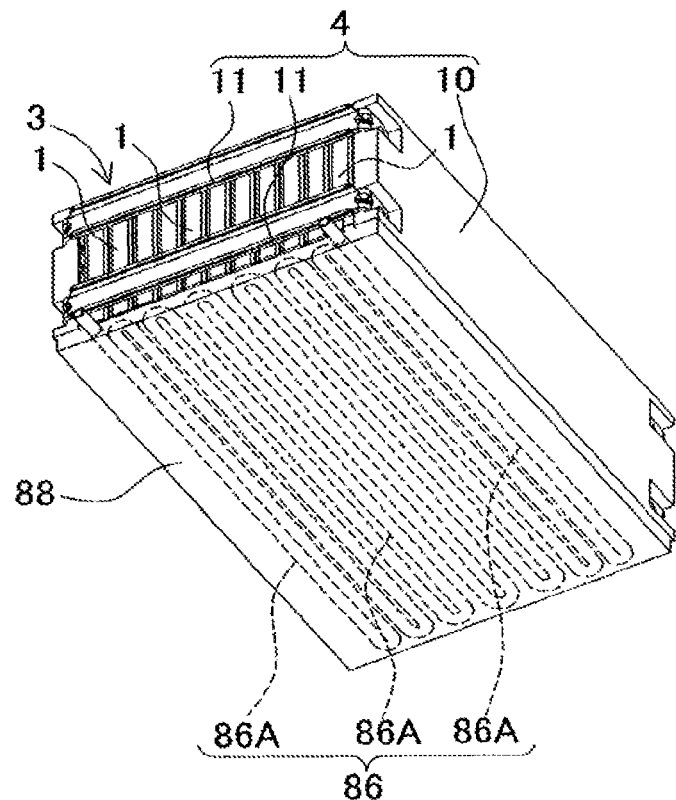
FIG. 21 is a perspective bottom view of the battery system shown in FIG. 20.
Figure 22:
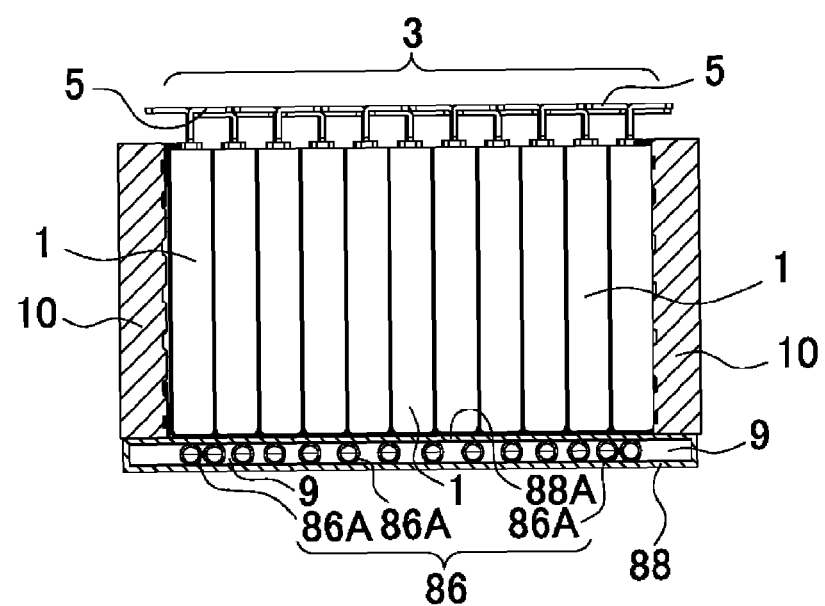
FIG. 22 is a transverse vertical cross-sectional view of the battery system shown in FIG. 21.
Figure 23:
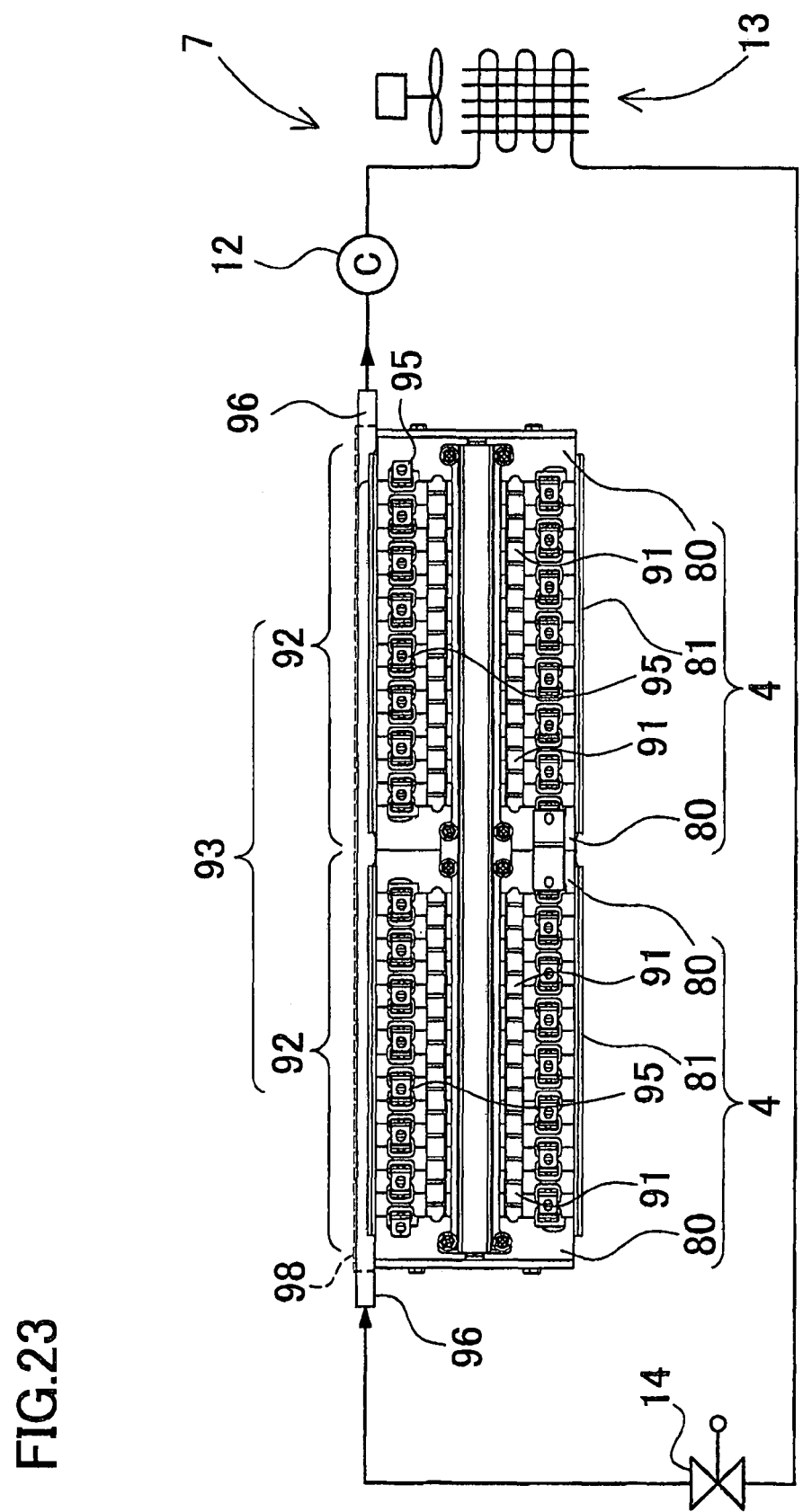
FIG. 23 is a schematic view showing the structure of a battery system according to a ninth embodiment of the present invention.
Figure 24:
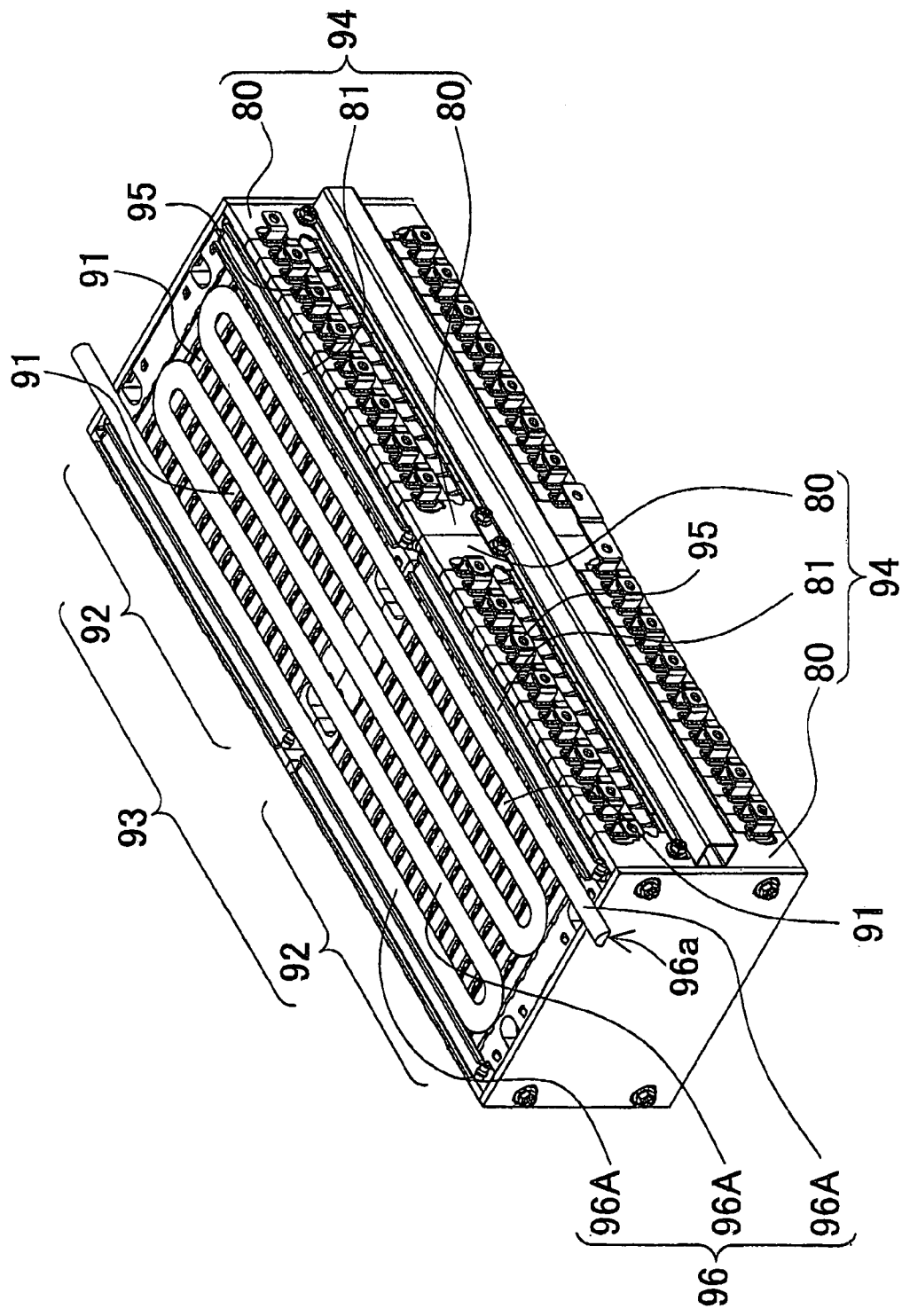
FIG. 24 is a perspective view of the battery system shown in FIG. 23.
Figure 25:
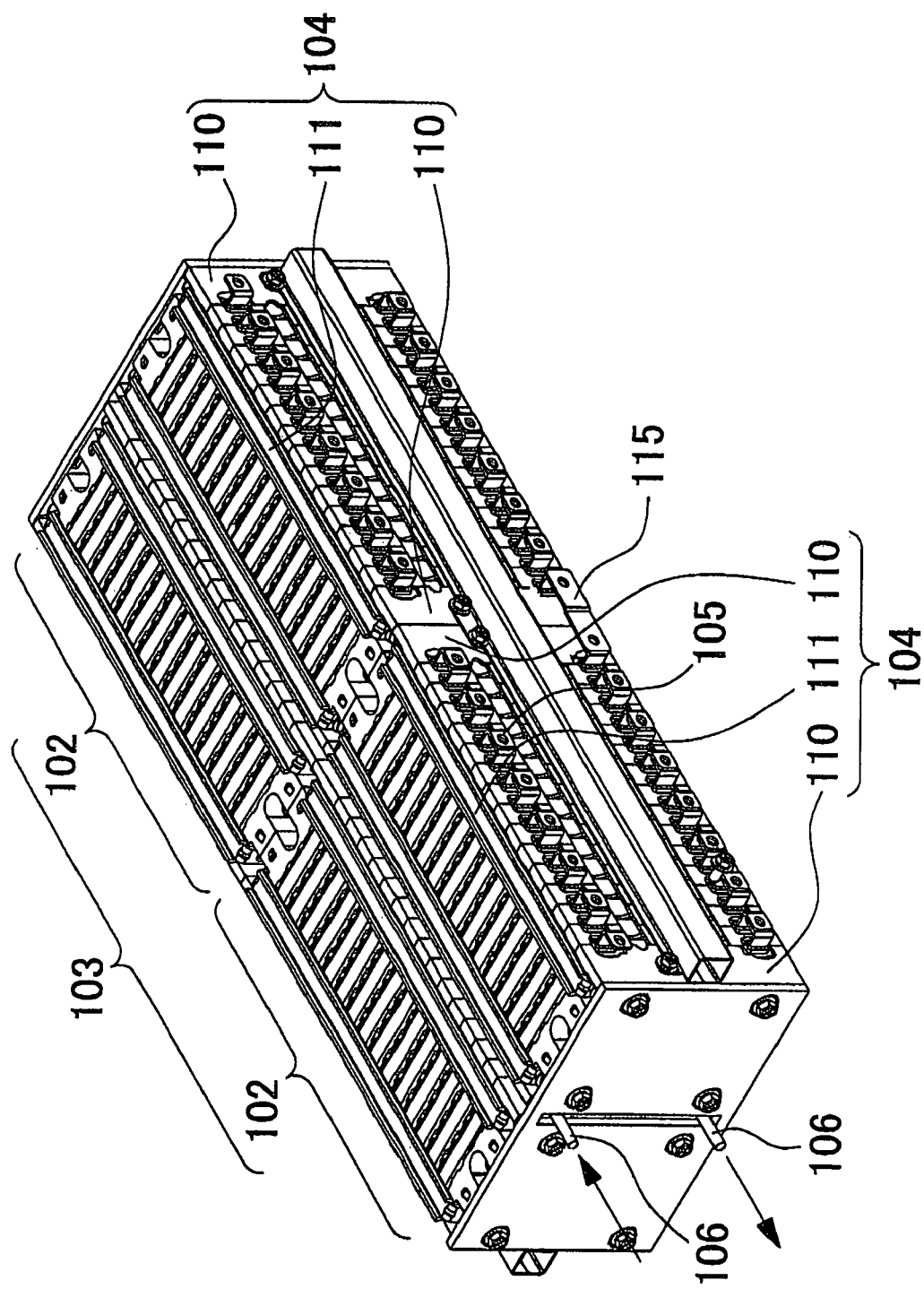
FIG. 25 is a perspective view of a battery system according to a tenth embodiment of the present invention.
Figure 26:
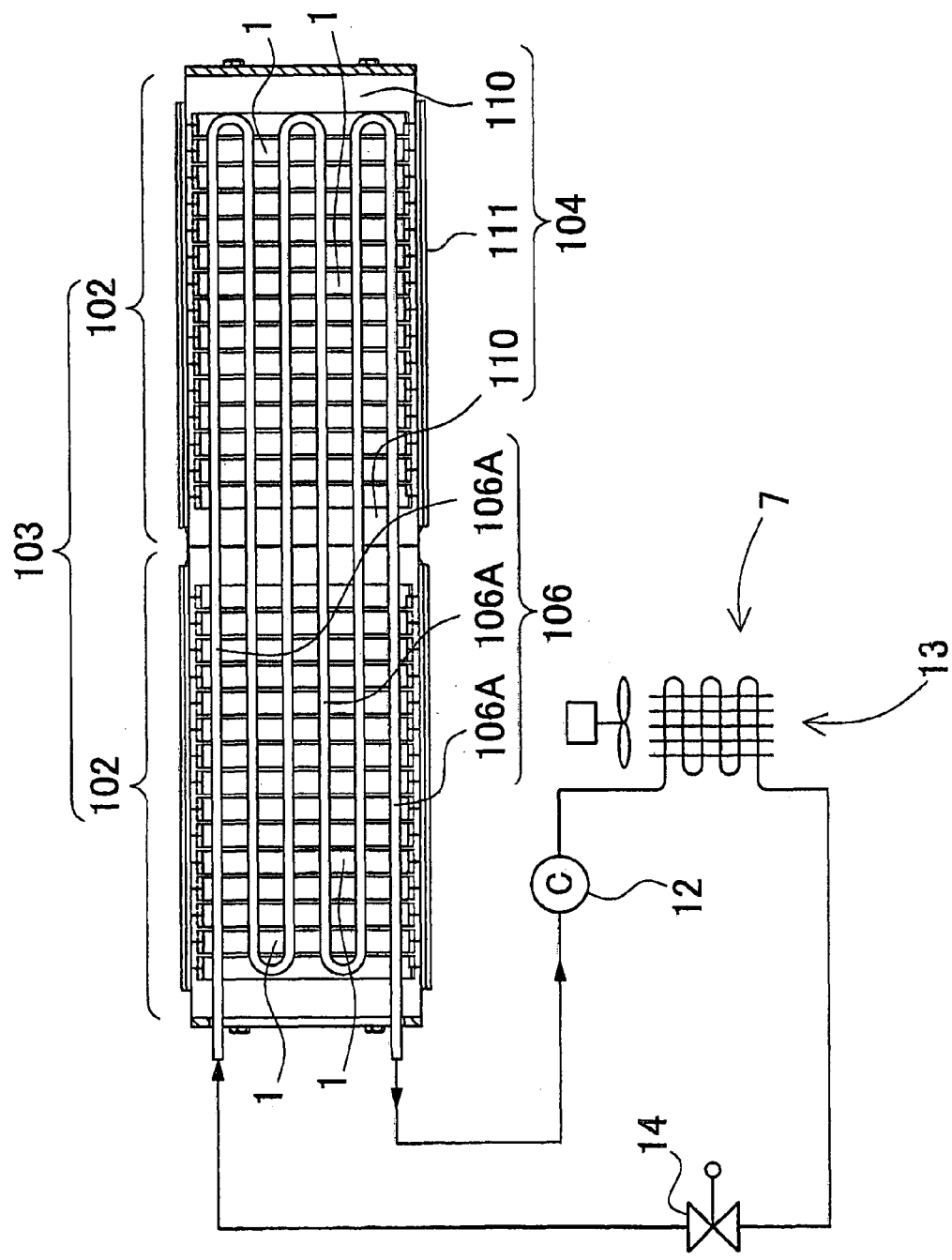
FIG. 26 is a longitudinal vertical cross-sectional view of the battery system shown in FIG. 25.
Figure 27:
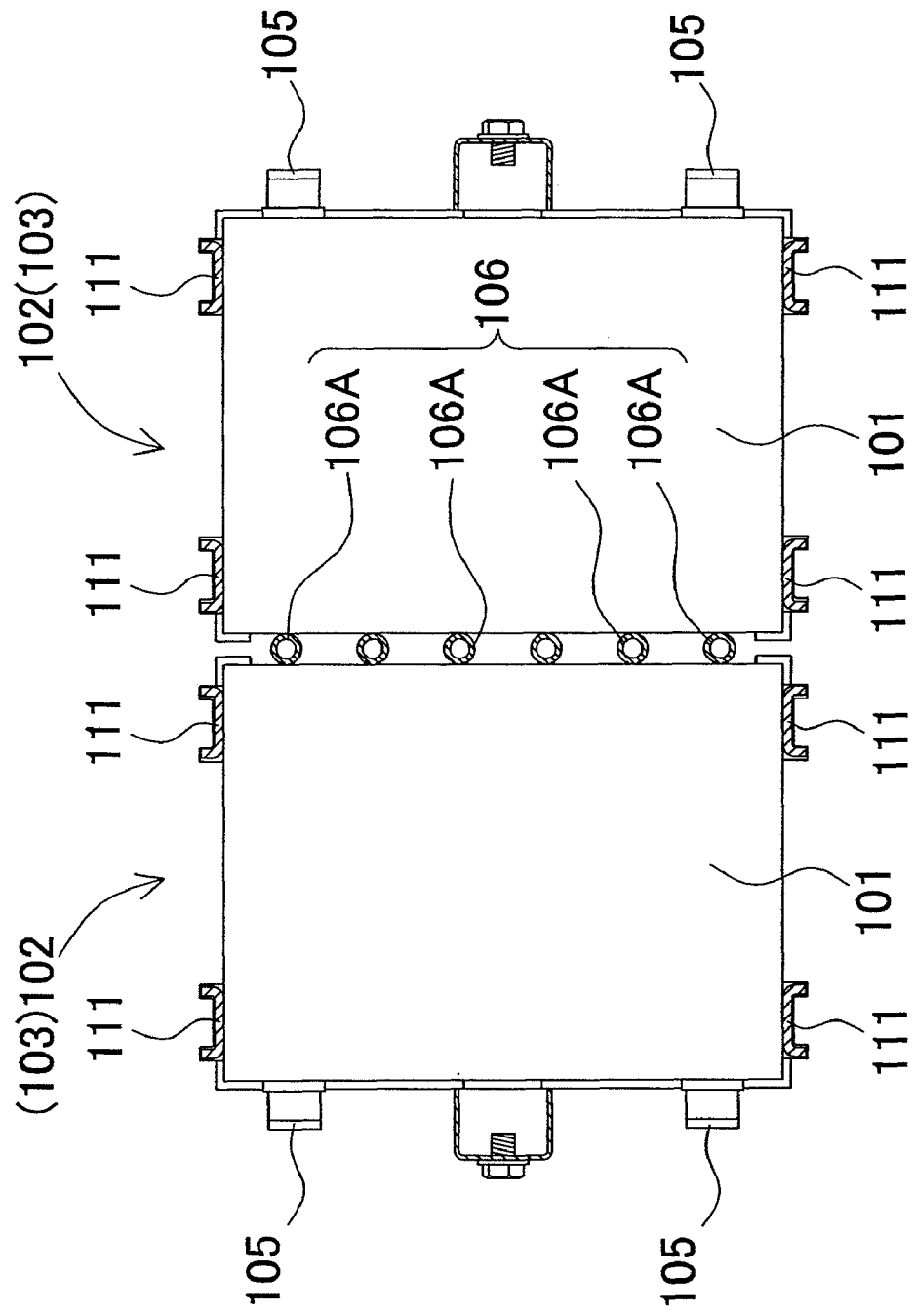
FIG. 27 is a transverse vertical cross-sectional view of the battery system shown in FIG. 25.
Figure 28:
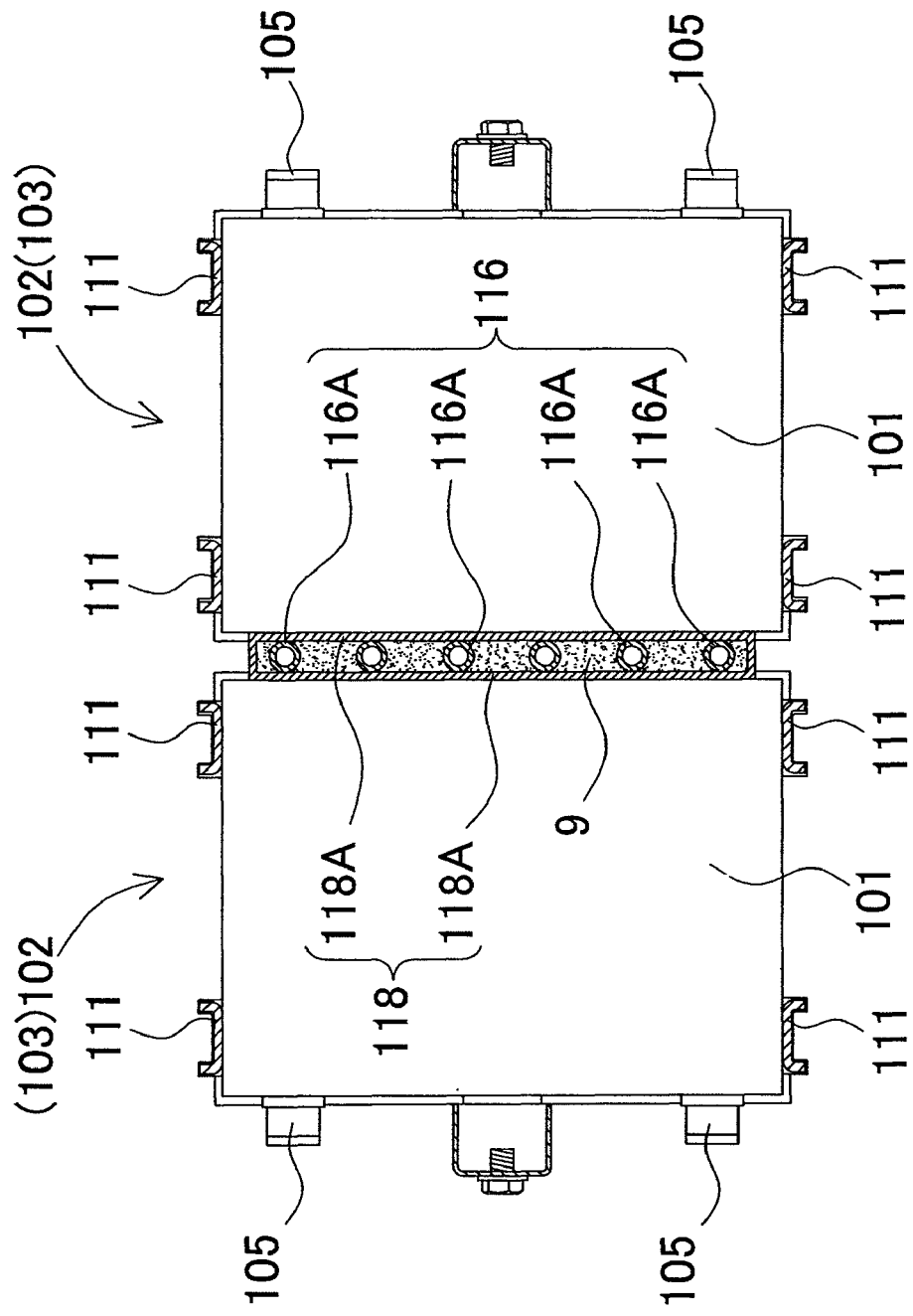
FIG. 28 is a transverse vertical cross-sectional view of a battery system according to an eleventh embodiment of the present invention.

FIGS. 1 to 3 show a first embodiment. FIGS. 4 to 6 show a second embodiment. FIGS. 7 and 8 show a third embodiment. FIGS. 9 and 10 show a fourth embodiment. FIGS. 11 to 13 show a fifth embodiment. FIGS. 14 to 16 show a sixth embodiment. FIGS. 17 to 19 show a seventh embodiment. FIGS. 20 to 22 show an eighth embodiment. FIGS. 23 and 24 show a ninth embodiment. FIGS. 25 to 27 show a tenth embodiment. FIG. 28 shows an eleventh embodiment.

Figure 29:
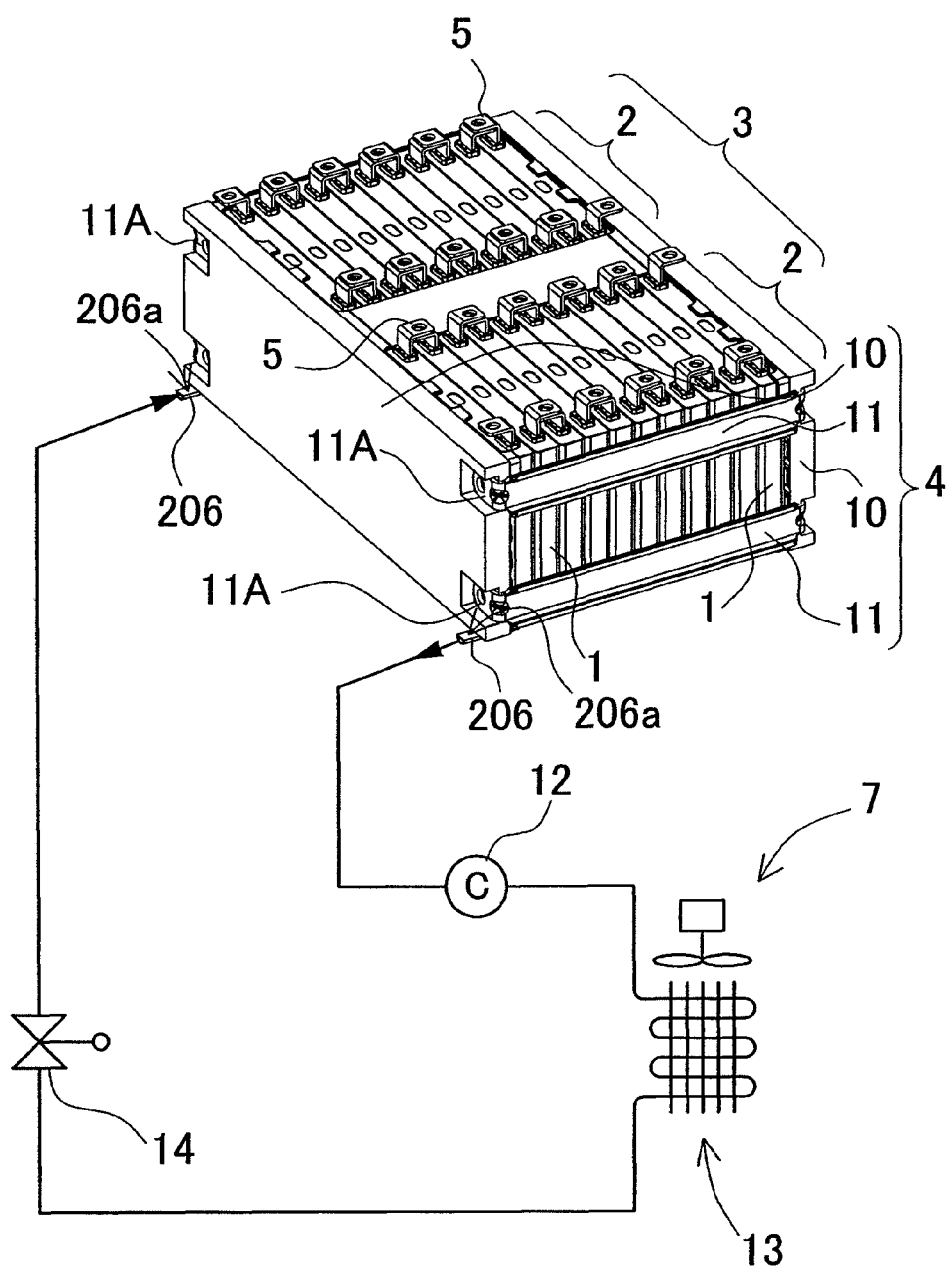
FIG. 29 is a schematic view showing the structure of a battery system according to a twelfth embodiment of the present invention.
Figure 30:
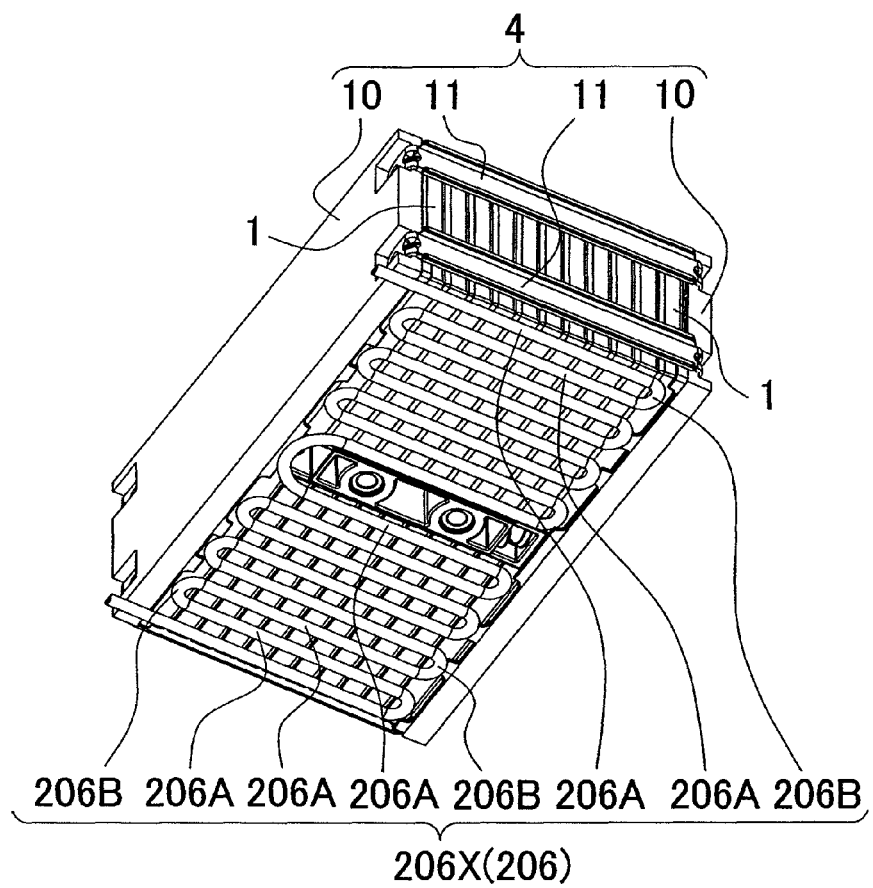
FIG. 30 is a perspective bottom view of the battery system shown in FIG. 29.
Figure 31:
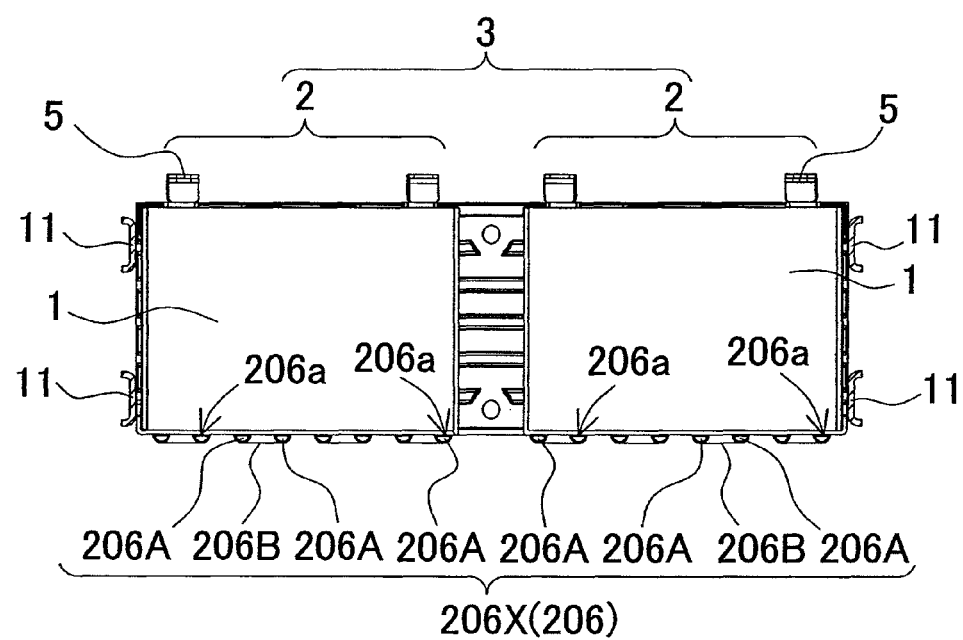
FIG. 31 is a longitudinal vertical cross-sectional view of the battery system shown in FIG. 29.
Figure 32:
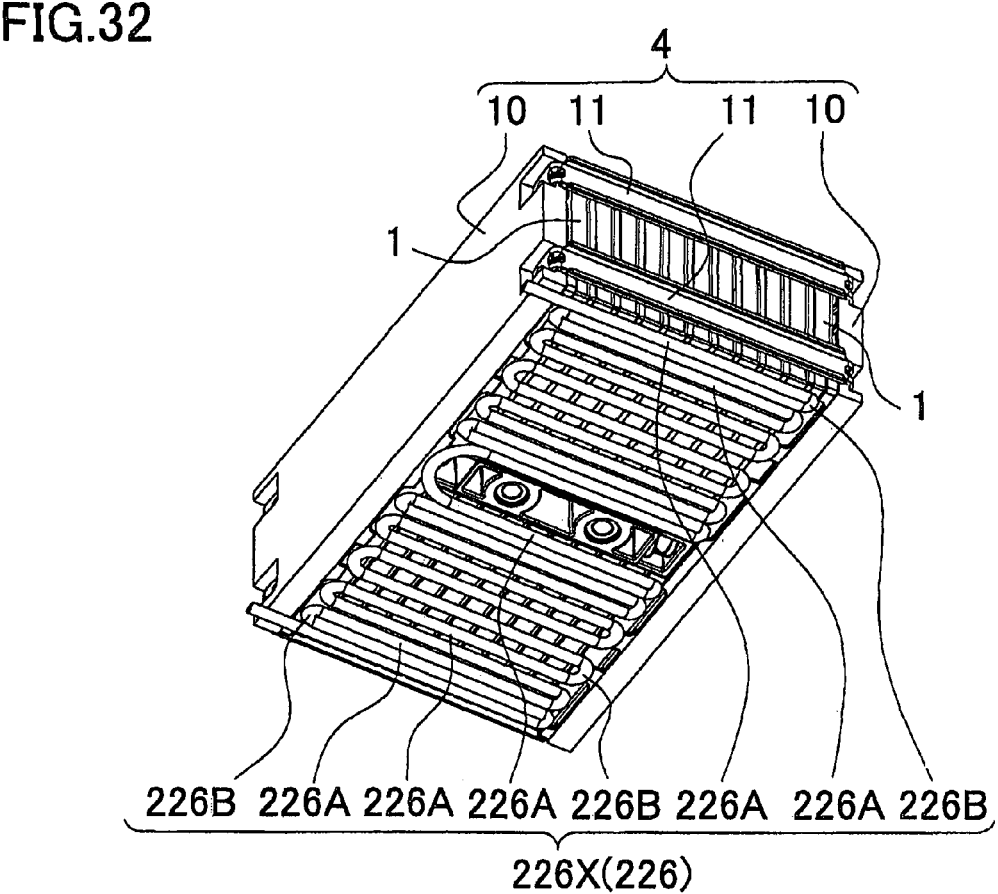
FIG. 32 is a bottom perspective view of a battery system according to a thirteenth embodiment of the present invention.
Figure 33:
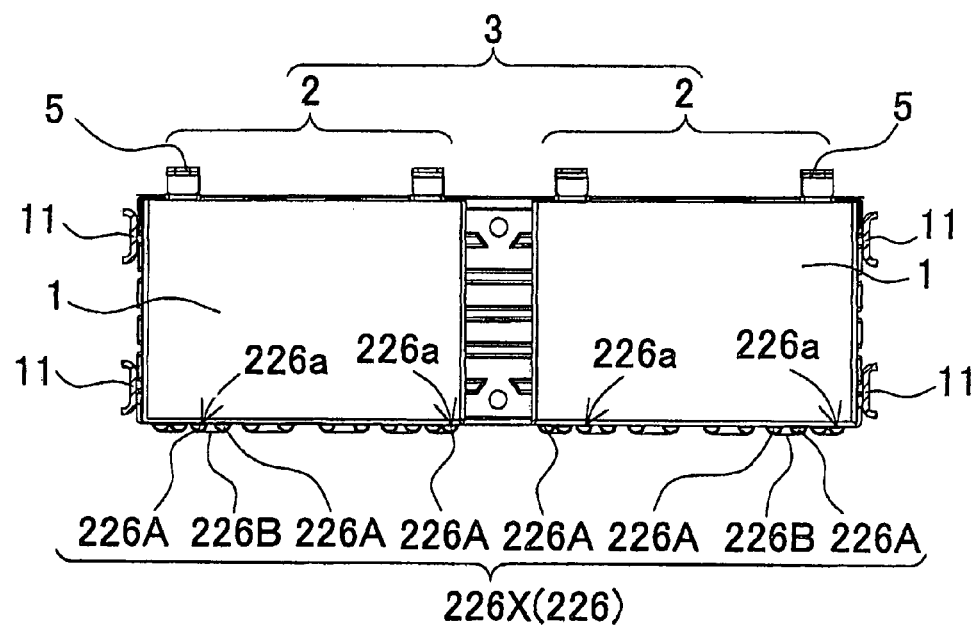
FIG. 33 is a longitudinal vertical cross-sectional view of the battery system shown in FIG. 32.
Figure 34:
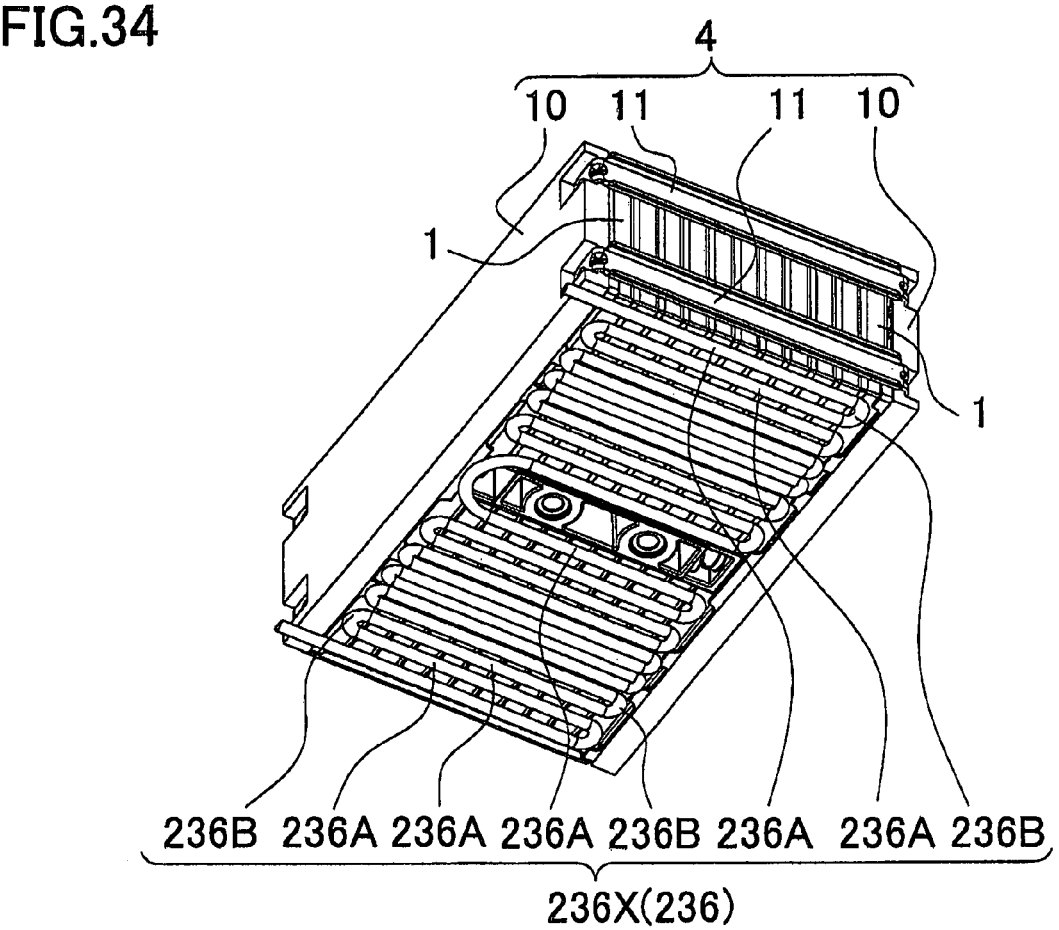
FIG. 34 is a bottom perspective view of a battery system according to a fourteenth embodiment of the present invention.
Figure 35:
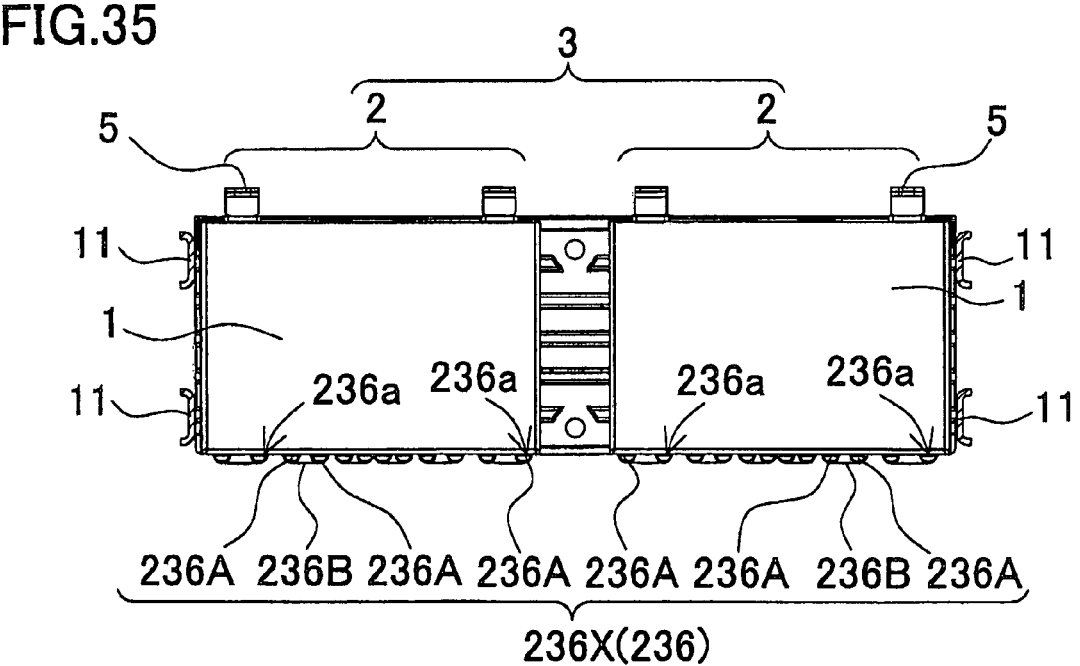
FIG. 35 is a longitudinal vertical cross-sectional view of the battery system shown in FIG. 34.
Figure 36:
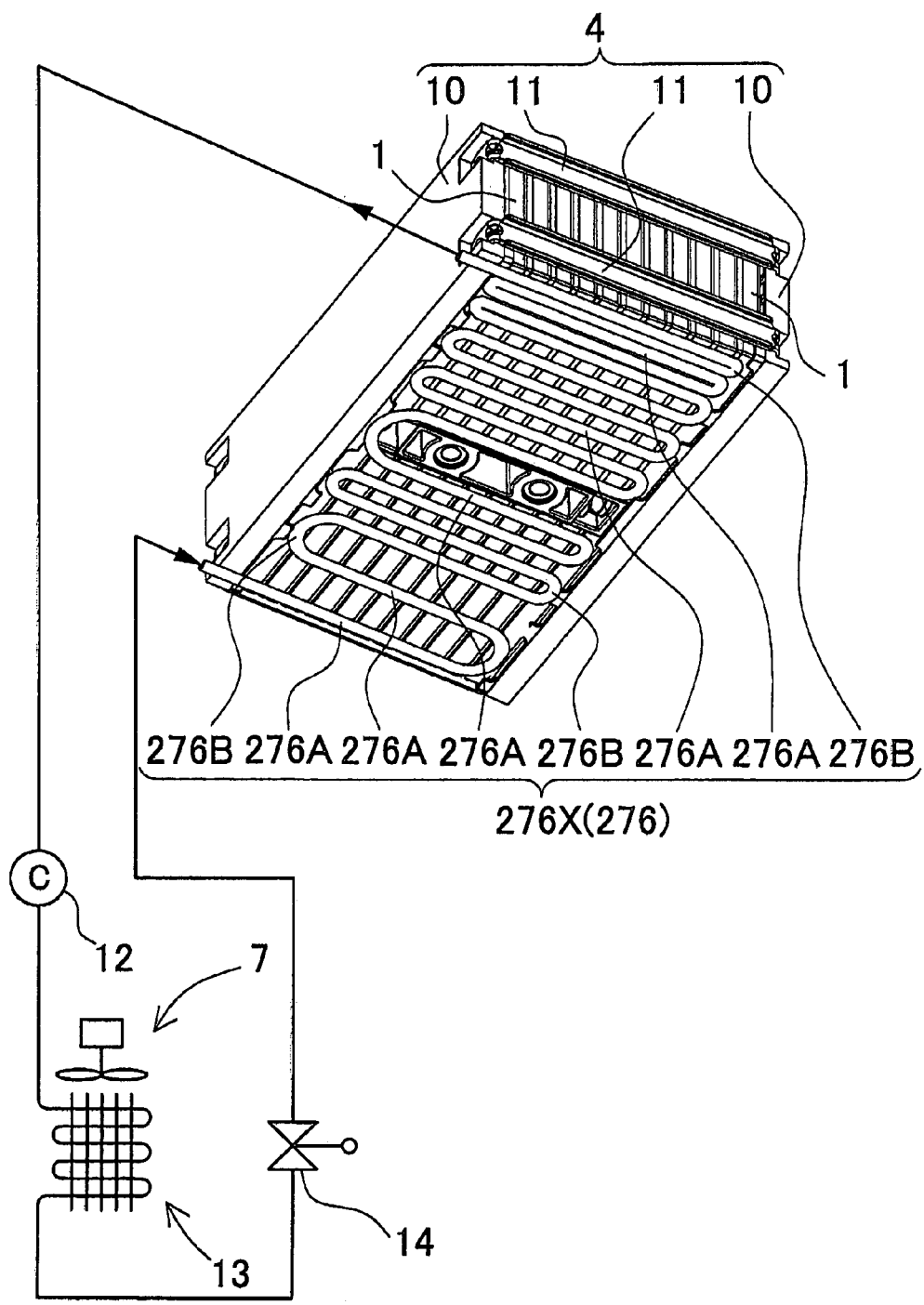
FIG. 36 is a schematic view showing the structure of a battery system according to a fifteenth embodiment of the present invention.
Figure 37:
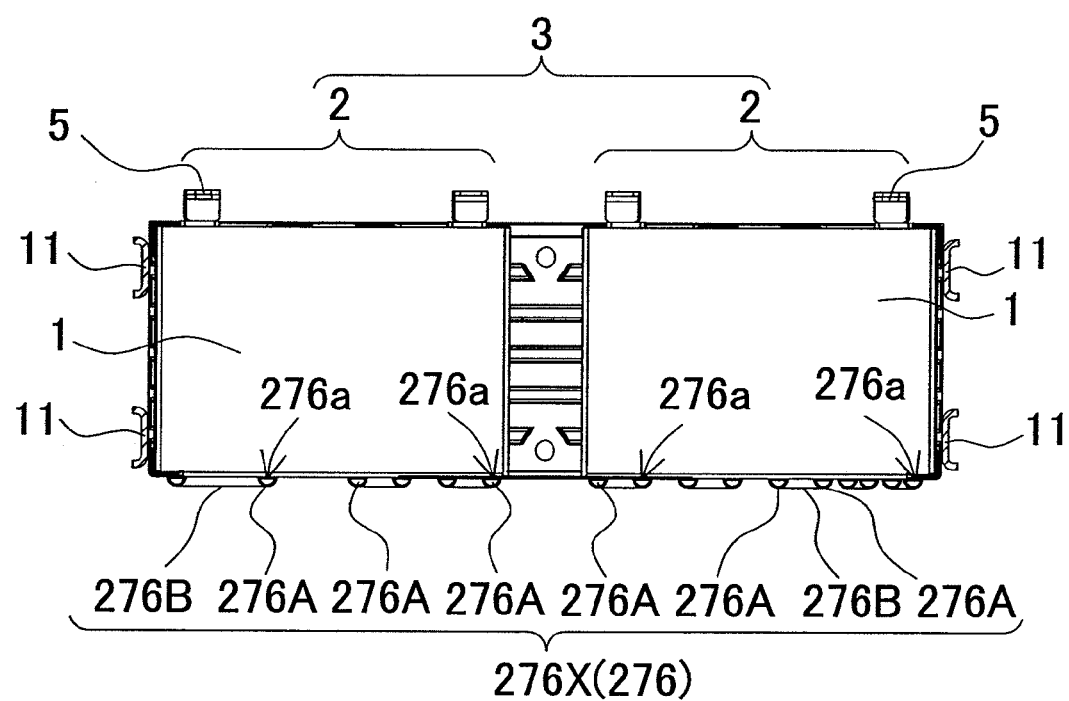
FIG. 37 is a longitudinal vertical cross-sectional view of the battery system shown in FIG. 36.
Figure 38:
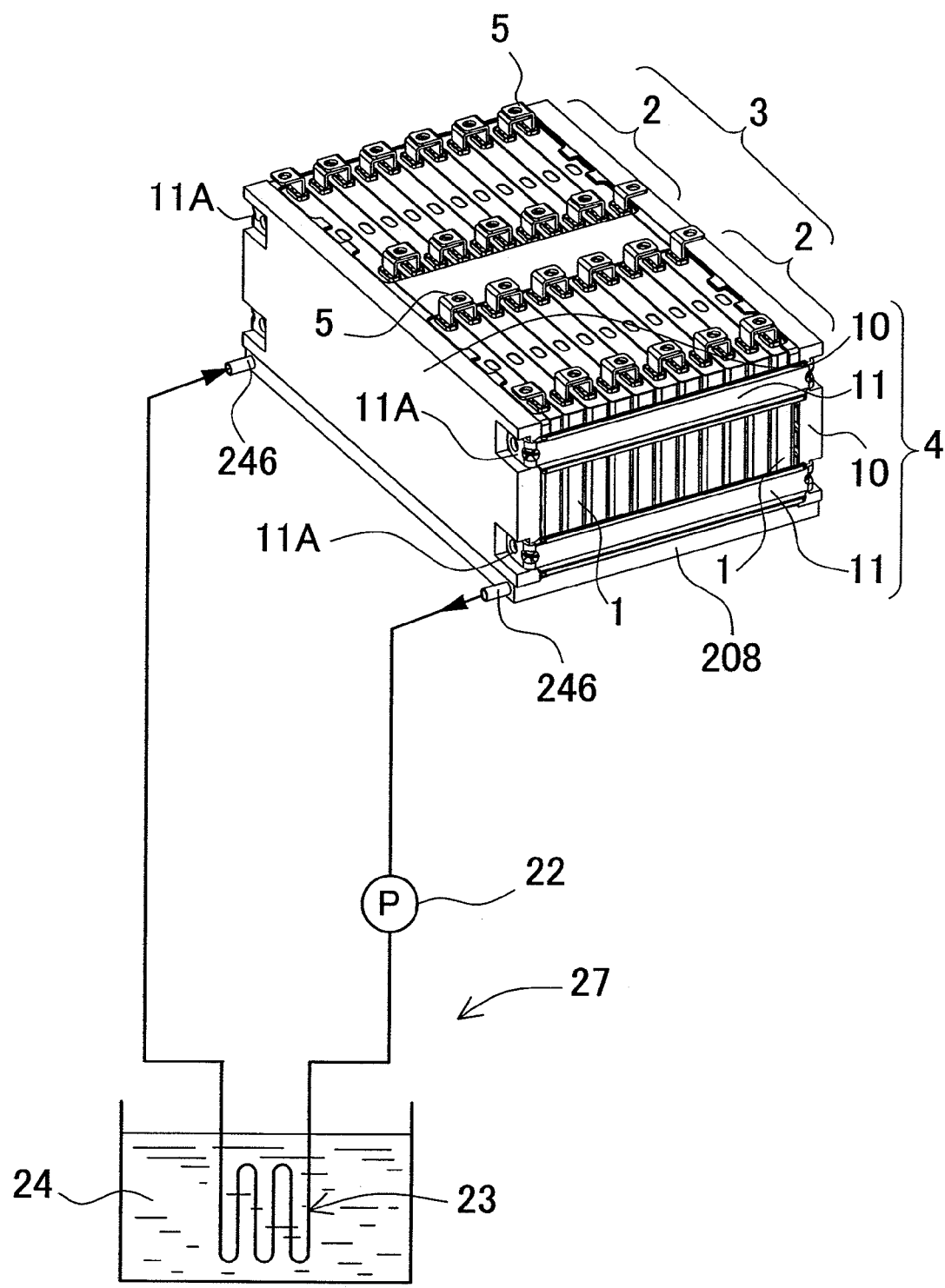
FIG. 38 is a schematic view showing the structure of a battery system according to a sixteenth embodiment of the present invention.
Figure 39:
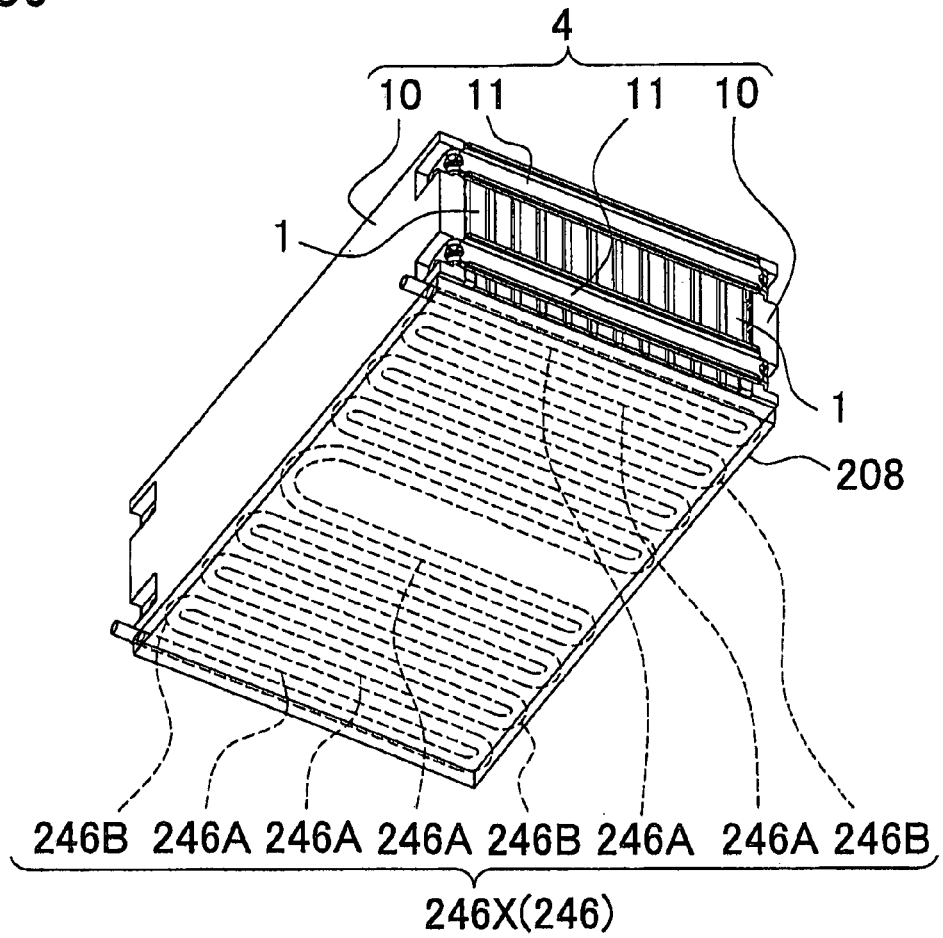
FIG. 39 is a perspective bottom view of the battery system shown in FIG. 38.
Figure 40:
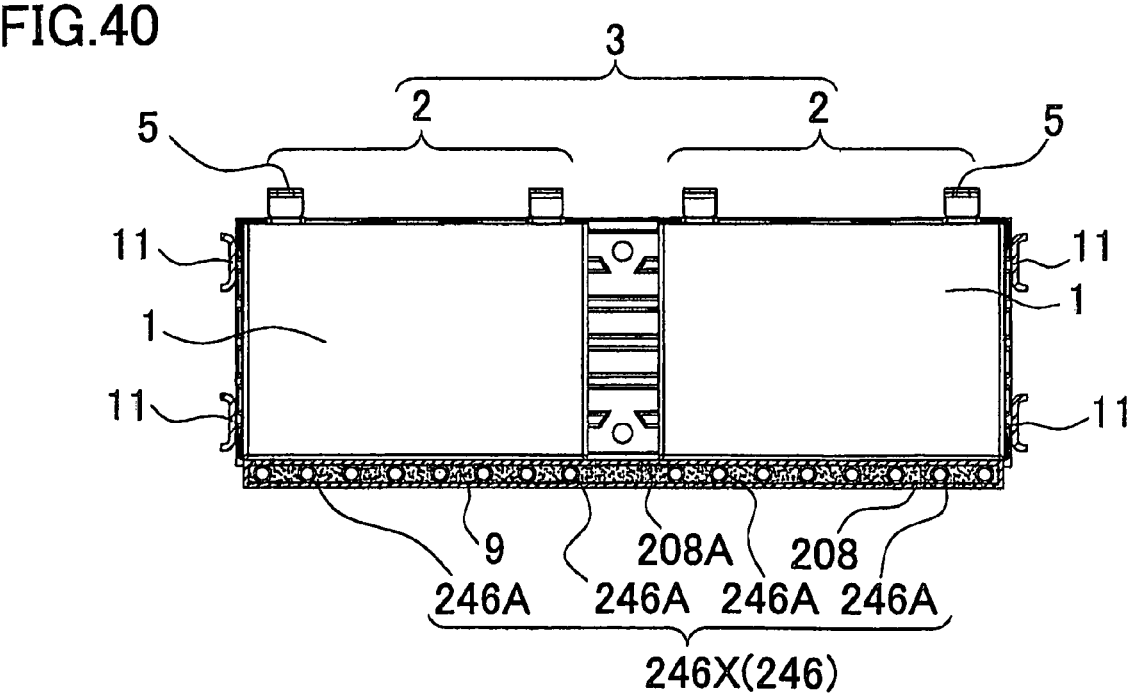
FIG. 40 is a longitudinal vertical cross-sectional view of the battery system shown in FIG. 38.
Figure 41:
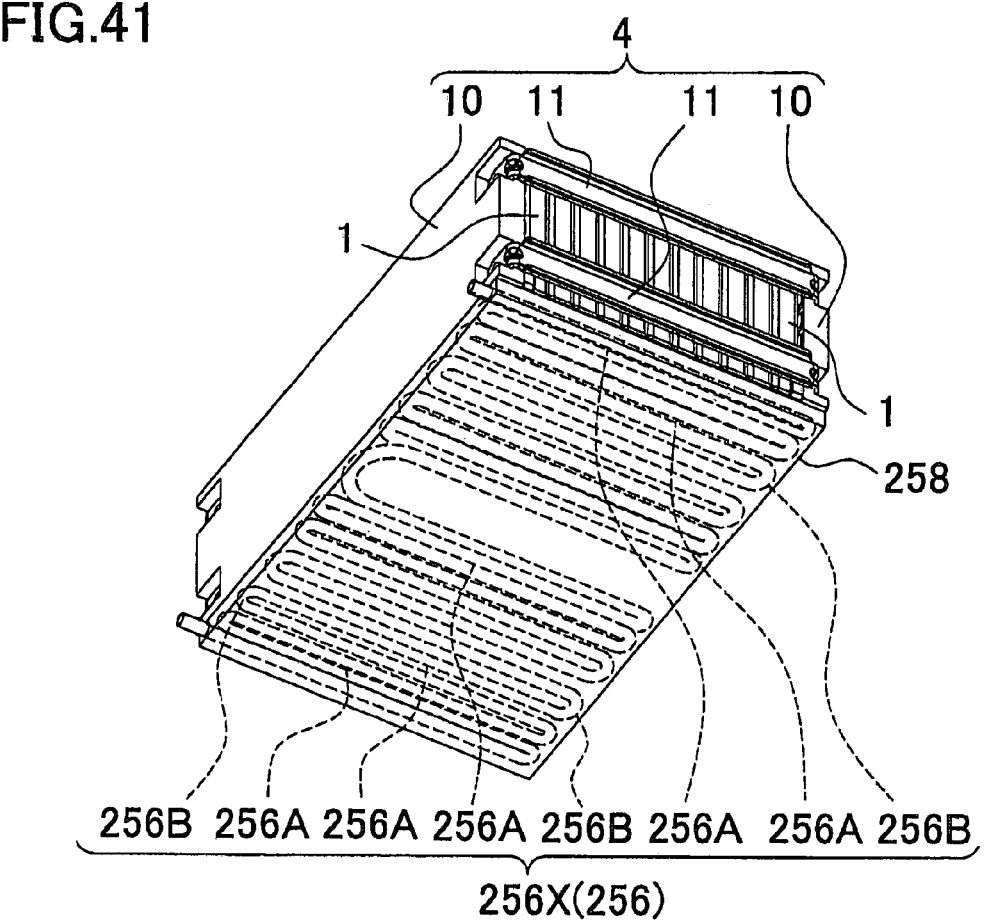
FIG. 41 is a bottom perspective view of a battery system according to a seventeenth embodiment of the present invention.
Figure 42:
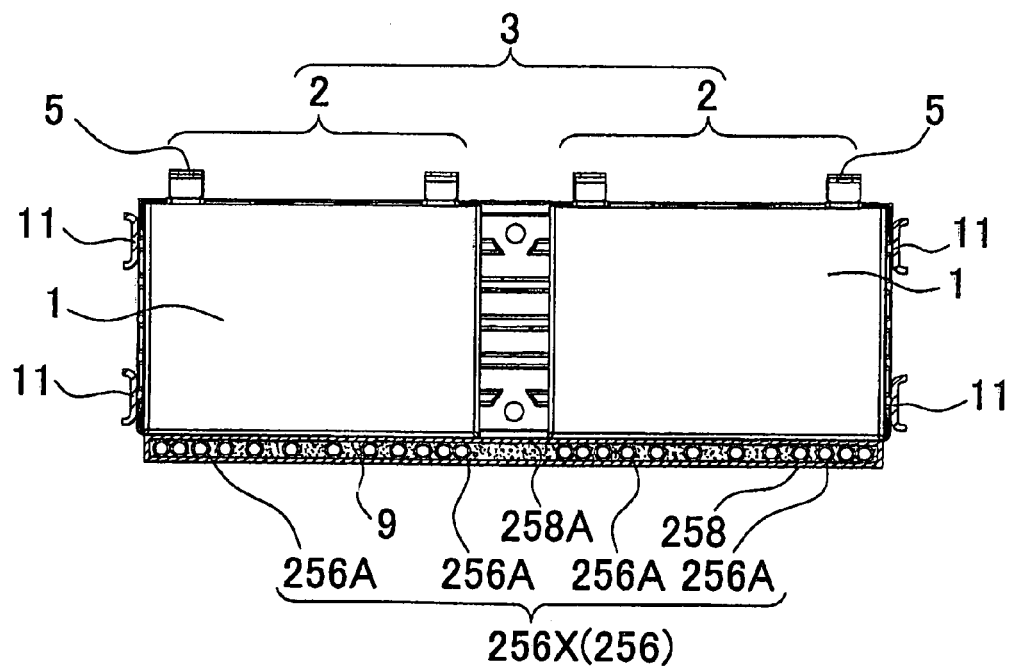
FIG. 42 is a longitudinal vertical cross-sectional view of the battery system shown in FIG. 41.
Figure 43:
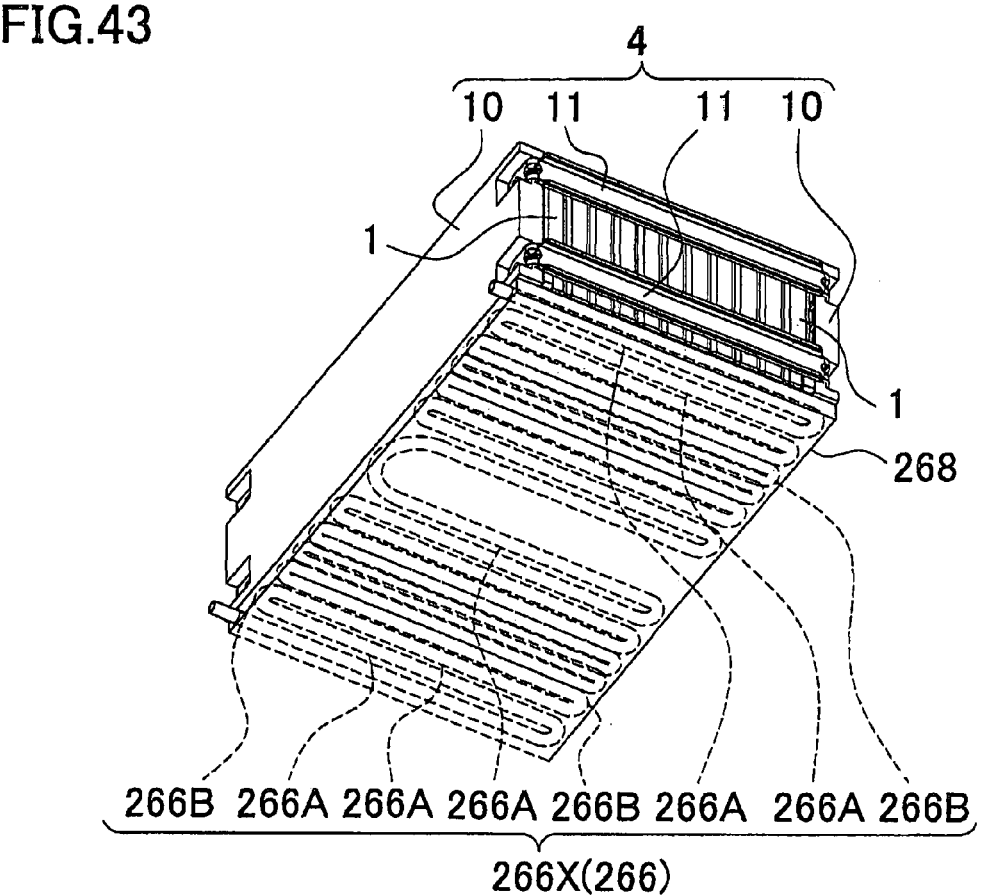
FIG. 43 is a bottom perspective view of a battery system according to an eighteenth embodiment of the present invention.
Figure 44:
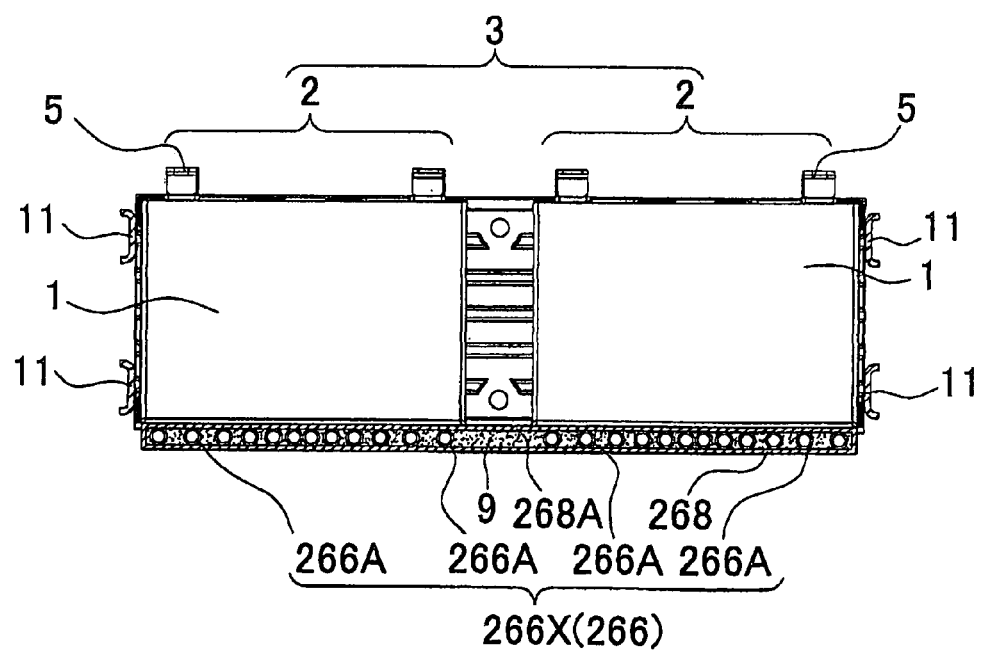
FIG. 44 is a longitudinal vertical cross-sectional view of the battery system shown in FIG. 43.
Figure 45:
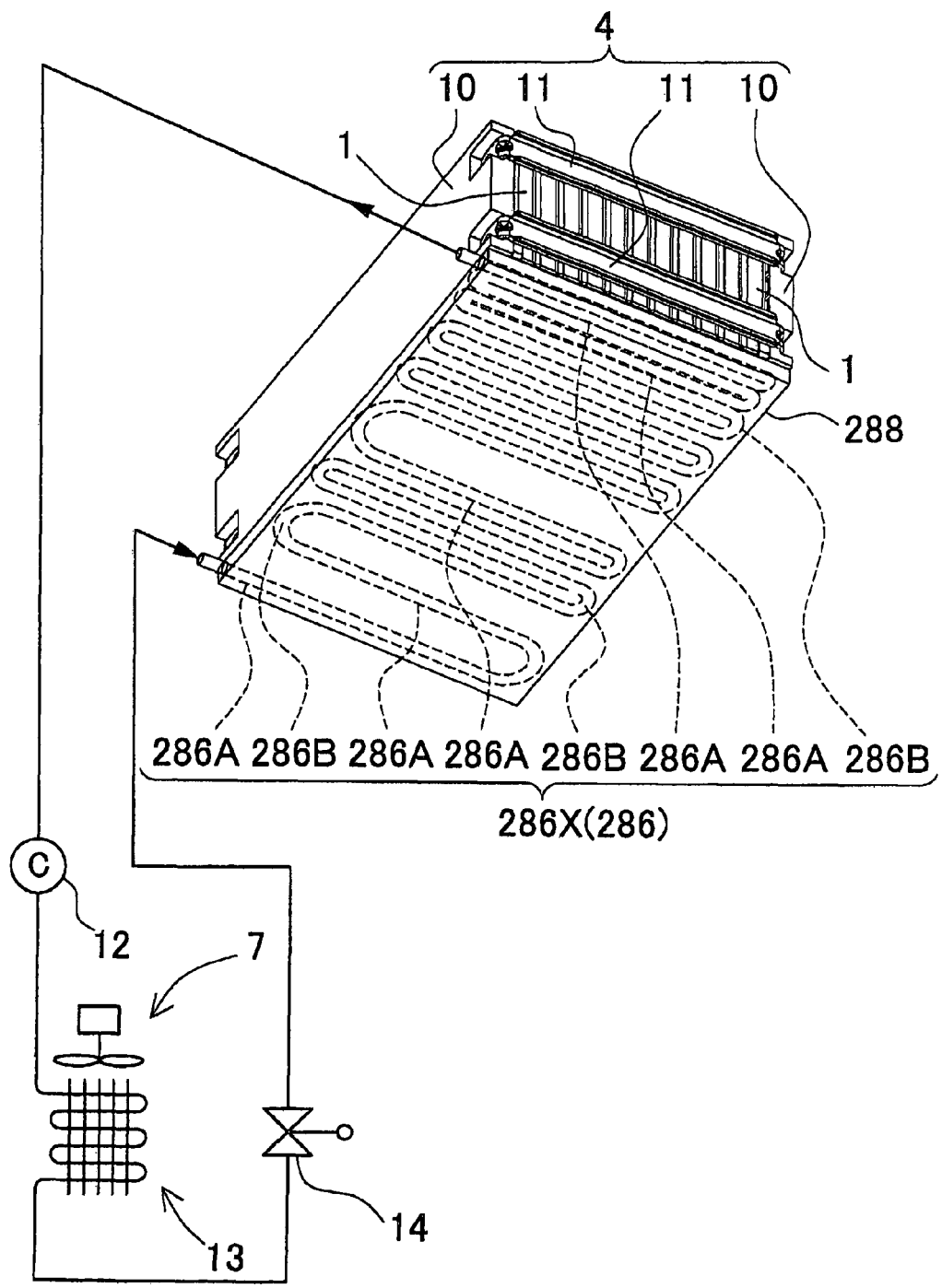
FIG. 45 is a schematic view showing the structure of a battery system according to a nineteenth embodiment of the present invention.
Figure 46:
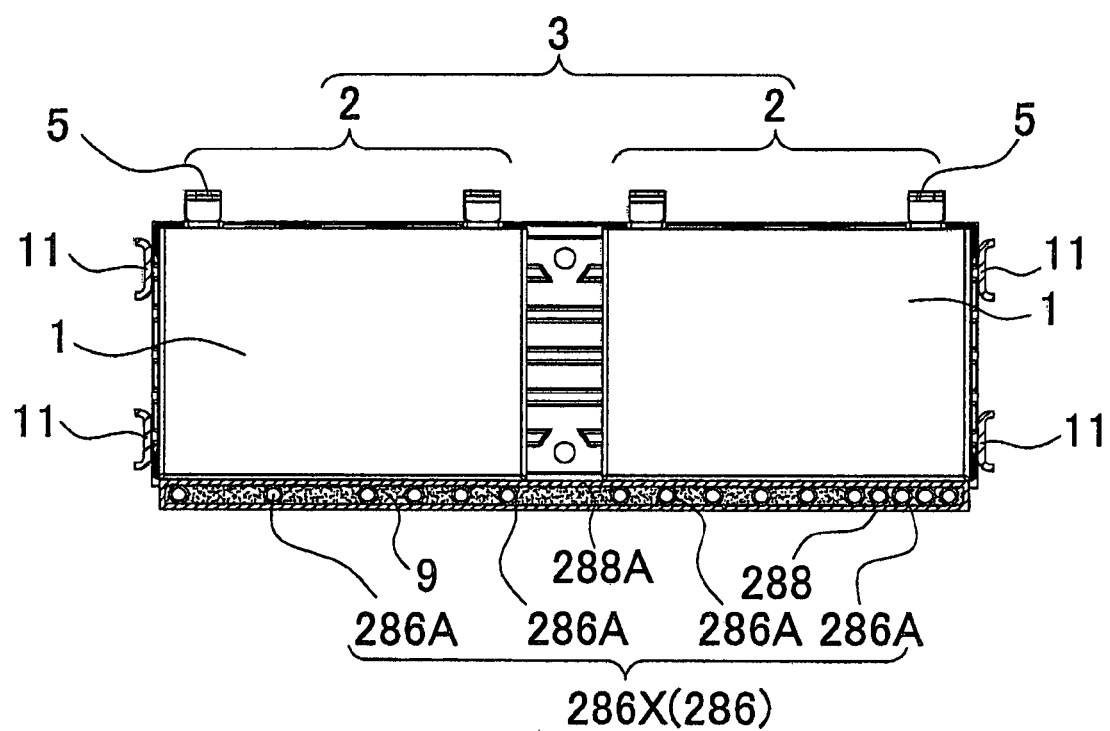
FIG. 46 is a longitudinal vertical cross-sectional view of the battery system shown in FIG. 45.
Figure 47:
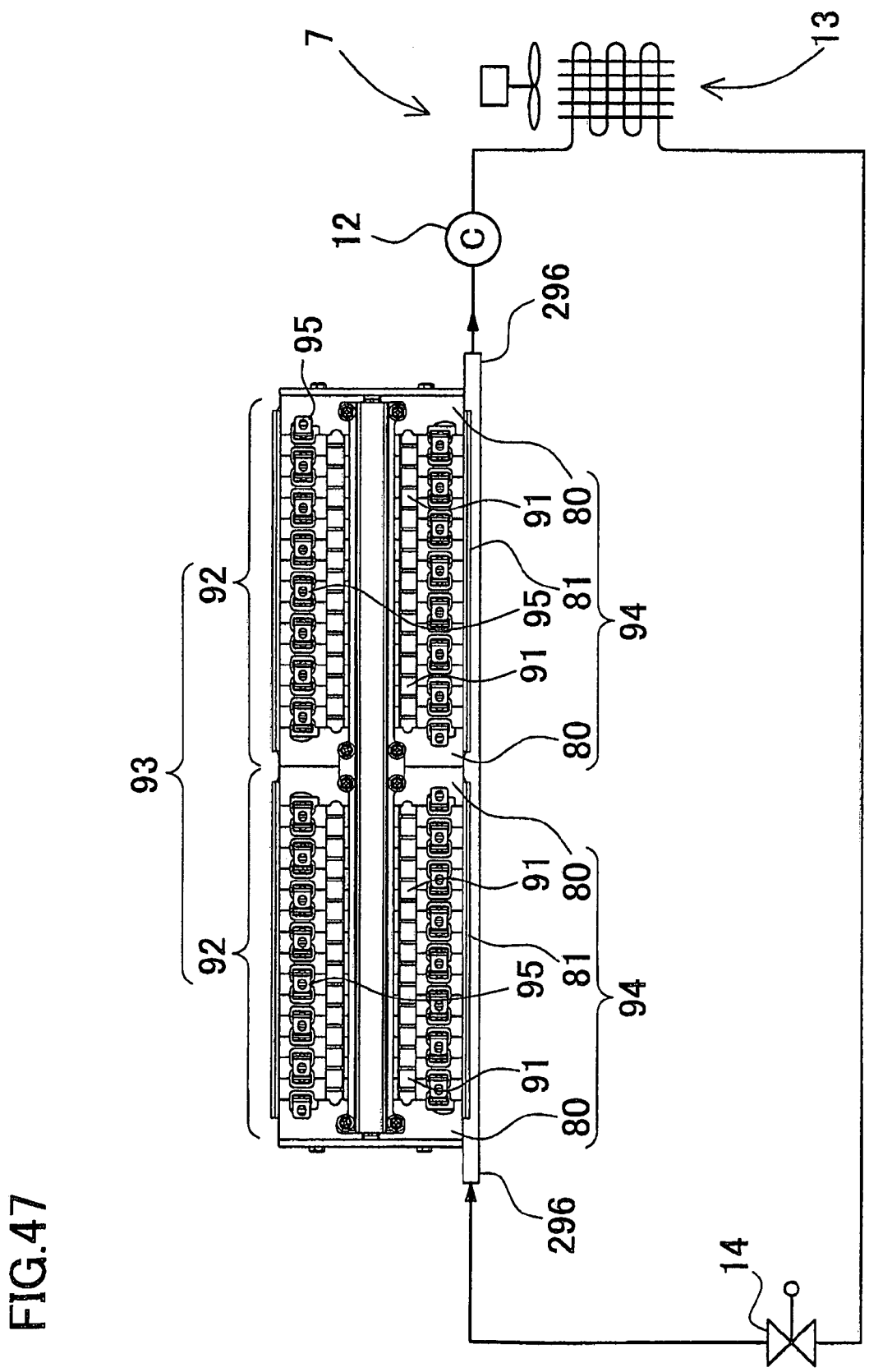
FIG. 47 is a schematic view showing the structure of a battery system according to a twentieth embodiment of the present invention.
Figure 48:
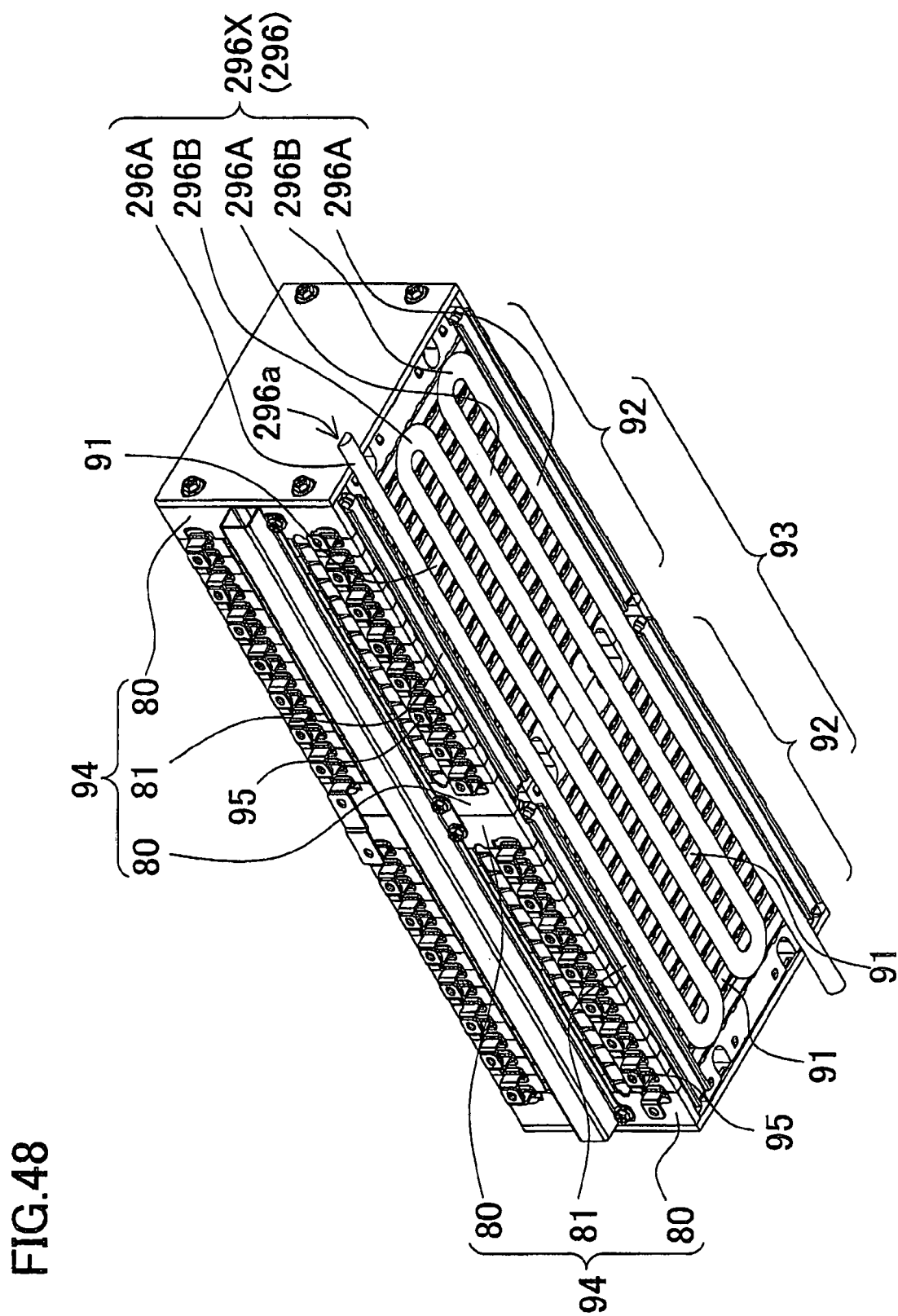
FIG. 48 is a perspective view of the battery system shown in FIG. 47.

FIGS. 29 to 31 show a twelfth embodiment. FIGS. 32 and 33 show a thirteenth embodiment. FIGS. 34 and 35 show a fourteenth embodiment. FIGS. 36 and 37 show a fifteenth embodiment. FIGS. 38 to 40 show a sixteenth embodiment. FIGS. 41 and 42 show a seventeenth embodiment. FIGS. 43 and 44 show an eighteenth embodiment. FIGS. 45 and 46 show a nineteenth embodiment. FIGS. 47 and 48 show a twentieth embodiment. In these Figures, components that are the same as or similar to those of other Figures are labeled with the same reference letters or numerals.

Battery systems shown in these embodiments are suitable mainly for power supplies of electric vehicles such as hybrid cars that are driven by both an engine and a motor, and electric vehicles that are driven only by a motor. However, the battery systems can be used for vehicles other than hybrid cars and electric vehicles, and can be also used for applications other than electric vehicle that require high power.

The battery system shown in each of the following embodiments includes a battery block 3, 93 or 103, a cooling pipe 6, 26, 36, 46, 56, 66, 76, 86, 96, 106, 116, 206, 226, 236, 246, 256, 266, 276, 286 or 296, and a coolant feeding device 7 or 27. In the battery block 3, 93 or 103, a plurality of rectangular batteries 1, 91 or 101 are arranged in array alignment by a battery holder 4, 94 or 104. The thickness of the rectangular batteries 1, 91 or 101 is greater than their width. The cooling pipe 6, 26, 36, 46, 56, 66, 76, 86, 96, 106, 116, 206, 226, 236, 246, 256, 266, 276, 286 or 296 cools the rectangular batteries 1, 91 or 101 of the battery block 3, 93 or 103. The coolant feeding device 7 or 27 feeds coolant to the cooling pipe 6, 26, 36, 46, 56, 66, 76, 86, 96, 106, 116, 206, 226, 236, 246, 256, 266, 276, 286 or 296.

In each of the battery systems shown in FIGS. 1 to 22 and 29 to 46, the rectangular batteries 1 are arranged in two lines as two battery units 2 and securely arranged by the battery holder 4. The two lines of battery units 2 have the same number of the rectangular batteries 1 that are arranged in array alignment. In the illustrated battery block 3, each battery unit 2 includes eleven rectangular batteries 1. Thus, the battery block 3 includes total twenty-two rectangular batteries 1. In the battery block 3, the two lines of the battery units 2 are securely arranged by the battery holder 4 so that two lines of the battery units 2 are arranged adjacent to each other and the rectangular batteries 1 of the two lines of the battery units 2 are arranged in parallel to each other. In the battery block 3, the rectangular batteries 1 of each battery unit 2 that are arranged adjacent to each other are coplanarly arranged. However, in the battery system according the present invention, the rectangular batteries are not necessarily securely arranged by the battery holder to be arranged in two lines as two battery units. For example, the rectangular batteries can be arranged in one line as a battery unit or in three or more lines as battery units.

In the battery block 3, spacers (not shown) are interposed between the rectangular batteries 1 that are arranged in array alignment. The spacers insulate adjacent rectangular batteries 1 from each other. The spacers have a shape that has opposed surfaces that hold the rectangular batteries 1 in a predetermined position so that the rectangular batteries 1 are fitted to the spacers. Thus, adjacent rectangular batteries 1 can be arranged in array alignment without deviation from the predetermined position. Exterior cases of the rectangular batteries 1 that are arranged in array alignment and insulated from each other by the spacers can be made of metal such as aluminum. The metal exterior case has excellent heat conductivity. Thus, heat will efficiently spread, and as a result the temperature of the metal exterior case can be uniform over the entire of the exterior case. In this case, the difference of temperature of the entire rectangular battery can be small by cooling the bottom surface of rectangular battery by the cooling pipe. However, in the battery system according to the present invention, the exterior case of the rectangular battery can be made of an insulating material such as plastic. In this case, the rectangular batteries can be arranged in the battery block without the spacers. However, in the structure that interposes the spacers between the rectangular batteries, in the case where the spacers are made of plastic or the like, which has small heat conductivity, there is an effect in that adjacent rectangular batteries can be effectively prevented from thermal runaway.

The width of the illustrated rectangular batteries 1 is greater than their thickness. In other words, the rectangular batteries 1 are thin rectangular batteries the thickness of which is smaller than their width. The rectangular batteries 1 are arranged in the thickness direction as the battery block 3 in array alignment. The rectangular batteries 1 are lithium-ion rechargeable batteries. However, the rectangular batteries may be nickel-hydrogen batteries or nickel-cadmium batteries. The illustrated rectangular batteries 1 have opposed quadrangular surfaces that have a long width. The rectangular batteries 1 are arranged in array alignment so that one of the opposed quadrangular surfaces of one rectangular battery faces one of the opposed quadrangular surfaces of another rectangular battery. Thus, the rectangular batteries 1 compose the battery block 3. The rectangular battery 1 includes positive/negative electrode terminals 5 that protrude from the ends of the upper surface of the rectangular battery 1, and an opening 1A for a safety valve that is located in the middle of the upper surface of the rectangular battery 1. In the illustrated rectangular batteries 1, the positive/negative electrode terminals 5 are bent toward opposed directions. The bent positive and negative electrode terminals 5 of adjacent rectangular batteries extend toward the bent negative and positive electrode terminals 5 of adjacent rectangular batteries. In the illustrated battery system, one of the positive and negative electrode terminals 5 is laid on and thus coupled to the other of the positive and negative electrode terminals 5 so that adjacent rectangular batteries 1 are serially connected to each other. Although not illustrated, the thus-coupled electrode terminals are coupled by a connector composed of a screw, a nut and the like. However, the positive/negative electrode terminals of rectangular batteries may be coupled by bus bars to be serially connected to each other. In the case of the battery system in which adjacent rectangular batteries are serially connected to each other, the output voltage of the battery system can be high, and as a result the battery system can provide high power. However, in the battery system according to the present invention, adjacent rectangular batteries may be connected in parallel.

The battery block 3 includes the rectangular batteries 1 that are securely arranged in array alignment by the battery holder 4. The battery holder 4 includes a pair of sandwich plates 10 that sandwich the rectangular batteries 1 in array alignment, and coupling members 11 that couple the sandwich plates 10. The sandwich plates 10 are arranged on opposed ends of the battery block 3, and the pair of sandwich plates 10 are coupled by the coupling members 11 so that the rectangular batteries 1 are securely arranged in array alignment by the battery holder 4. The sandwich plates 10 have a quadrangular shape substantially similar to the exterior shape of two rectangular batteries 1 that are arranged side by side. The coupling members 11 are secured to the sandwich plates 10 by stopping screws (not shown) at bent portions 11A of the coupling members 11 that are formed by bending the ends of the coupling members 11.

The illustrated sandwich plate 10 has coupling openings (not shown) for coupling the bent portions 11A of the coupling member 11. The illustrated sandwich plate 10 has four coupling openings arranged on the both sides at the four-corner parts of the sandwich plate 10. The coupling openings are threaded openings. The stopping screws pass through the bent portions 11A and are screwed into the threaded openings. Thus, the coupling member 11 can be secured to the sandwich plate 10.

The cooling pipe 6, 26, 36, 46, 206, 226, 236 or 276 shown in FIGS. 1 to 10 and 29 to 37 is arranged on and thermally coupled to the surface of the battery block 3 to cool the rectangular batteries 1 with the coolant that is circulated through the cooling pipe 6, 26, 36, 46, 206, 226, 236 or 276. In the illustrated battery system, the cooling pipe 6, 26, 36, 46, 206, 226, 236 or 276 is arranged on the bottom surface of the battery block 3 to cool the battery block 3 from the bottom side. However, the battery system according to the present invention is not limited to the arrangement in which the cooling pipe is arranged on the bottom surface of the battery block. The battery system according to the present invention may be arranged on the side surface or the upper surface of the battery block to cool the rectangular batteries. Specifically, as shown in FIGS. 23 to 27, in the battery system in which the rectangular batteries 91 or 101 are put into a sideways position, in other words, the positive/negative electrode terminals 95 or 105 are arranged on side surfaces of the battery system, the cooling pipe 96 can be arranged on a side surface of the rectangular batteries 91, which will be the upper surface of the battery block 93 as shown in FIG. 23 and FIG. 24 to cool the rectangular batteries 91. Alternatively, the cooling pipe 106 can be arranged on the bottom surfaces of the rectangular batteries 101, which will be a side surface of the battery block 103 to cool the rectangular batteries 101 as shown in FIGS. 25 to 27.

In the battery systems shown in FIGS. 1 to 10, 23 to 27, 29 to 37, 47 and 48, the cooling pipe 6, 26, 36, 46, 96, 106, 206, 226, 236, 276 or 296 is arranged to directly contact the rectangular batteries 1, 91 or 101, in other words, to be directly thermally coupled to the rectangular batteries 1, 91 or 101 for cooling the rectangular batteries 1, 91 or 101. In the battery systems shown in FIGS. 11 to 22, 28 and 38 to 46, a cooling plate 8, 68, 78, 88, 118, 208, 258, 268 or 288 is included that accommodates the cooling pipe 56, 66, 76, 86, 116, 246, 256, 266 or 286, and the cooling plate 8, 68, 78, 88, 118, 208, 258, 268 or 288 contacts the rectangular batteries 1 or 101 to be thermally coupled to the rectangular batteries 1 or 101. In the battery systems, the cooling pipe 56, 66, 76, 86, 116, 246, 256, 266 or 286 cools the rectangular batteries 1 or 101 through the cooling plate 8, 68, 78, 88, 118, 208, 258, 268 or 288.

In the battery system in which the exterior cases of rectangular batteries, and the cooling pipe or the cooling plate are made of metal, the cooling pipe or the cooling plate is electrically insulated from the rectangular batteries. Since the cooling pipe or the cooling plate is required to cool the rectangular batteries, the cooling pipe or the cooling plate is electrically insulated from the rectangular batteries but is secured to and thermally coupled to the rectangular batteries. The cooling pipe or the cooling plate is electrically insulated from the rectangular batteries by interposing an excellent heat conductive and electrically insulating material between the cooling pipe or the cooling plate and the rectangular batteries. However, in the case where the rectangular batteries have an insulating exterior case, the rectangular batteries can be secured to contact the cooling pipe or the cooling plate without using such an insulating material. The reason is that, in this case, a short circuit does not occur between the cooling pipe or the cooling plate and the rectangular batteries adjacent to the cooling pipe or the cooling plate.

The cooling pipe 6, 26, 36, 46, 56, 66, 76 or 86 shown in FIGS. 1 to 22 includes parallel piping portions 6A, 26A, 36A, 46A, 56A, 66A, 76A or 86A that are arranged in parallel to the rectangular batteries 1 to cool the rectangular batteries 1. The illustrated cooling pipe 6, 26, 36, 46, 56, 66, 76 or 86 is formed by bending one metal tube. The metal tube is a copper or aluminum pipe, which has excellent heat conductivity. The illustrated cooling pipe 6, 26, 36, 46, 56, 66, 76 or 86 is formed by bending a metal tube into a shape that includes straight portions that are arranged in parallel to each other, and U-bent portions that couple the ends of the straight portions. The parallel piping portions 6A, 26A, 36A, 46A, 56A, 66A, 76A or 86A are coplanarly arranged, and are thermally coupled to the surface of the battery block 3.

In the battery system shown FIGS. 1 to 3, the parallel piping portions 6A of the cooling pipe 6 are arranged in the bottom surfaces of the rectangular batteries 1 and extend right under the rectangular batteries 1. The parallel piping portions 6A are securely arranged in contact with the bottom surfaces of the rectangular batteries 1, in other words, are arranged right under the rectangular batteries 1 to cool the rectangular batteries 1 from the bottom side. This cooling pipe 6 can most efficiently cool the rectangular batteries 1 with the parallel piping portions 6A. The cooling pipe 6 includes a flat part 6a in cross-section that is located on the upper surface of the cooling pipe 6. The flat part 6a is securely arranged to contact the rectangular batteries 1 over a large area. Although the illustrated battery system is shaped so that the flat part 6a extends over the entire cooling pipe 6, the cooling pipe may be shaped so that only each parallel piping portion has the flat part. In the battery system in which the cooling pipe 6 has the flat part 6a that contacts the rectangular batteries 1, thermal coupling area between the cooling pipe 6 and the rectangular batteries 1 is large. Accordingly, it is possible to efficiently cool the rectangular batteries 1 with the cooling pipe 6.

In the battery system shown FIGS. 4 to 6, each of the parallel piping portions 26A of the cooling pipe 26 is arranged on the bottom surfaces of the rectangular batteries 1 and extends along the boundary between adjacent rectangular batteries 1. In the cooling pipe 26, each parallel piping portion contacts adjacent rectangular batteries 1. Since adjacent rectangular batteries 1 are located on and borne by the cooling pipe 26, the cooling pipe 26 firmly and stably bears the rectangular batteries 1 in array alignment, in other words, bears the rectangular batteries 1 without upward/downward deviation. Accordingly, the cooling pipe 26 effectively cools the rectangular batteries 1, and additionally firmly bears the rectangular batteries 1 to be arranged in array alignment. Particularly, in the battery system shown in FIGS. 4 to 6, the cooling pipe 26 has the flat part 26a, and adjacent rectangular batteries 1 are located on the flat part 26a to contact the flat part of one parallel piping portion, and are thermally coupled to the flat part of the one parallel piping portion. Accordingly, it is possible to effectively cool the rectangular batteries 1 with the cooling pipe 26, and additionally to stably and firmly secure the rectangular batteries 1.

In the battery systems shown in FIGS. 7 to 10, the densities of the parallel piping portions 36A or 46A are different between the ends and the middle of the battery block 3. In the battery system shown FIGS. 7 and 8, the parallel piping portions 36A of the cooling pipe 36 in the middle of the battery block 3 are arranged more tightly than at both ends of the battery block 3. The battery system can more efficiently cool the rectangular batteries 1 in the middle. For this reason, in the case where this arrangement is used in a battery system in which the temperature of the middle of the battery block 3 is likely to rise higher, the rectangular batteries 1 can be uniformly cooled. In the battery system shown FIGS. 9 and 10, the parallel piping portions 46A of the cooling pipe 46 at both ends of the battery block 3 are arranged more tightly than in the middle of the battery block 3. The battery system can cool rectangular batteries 1 that are arranged in the ends in array alignment more efficiently. For this reason, in the case where this arrangement is used in a battery system in which the temperature of rectangular batteries at the ends of the battery block 3 are likely to rise higher, the rectangular batteries 1 can be uniformly cooled. The cooling pipes 36 and 46 shown in FIGS. 7 to 10 also include flat parts 36a and 46a that contact the rectangular batteries 1.

In the battery systems shown in FIGS. 11 to 22, the cooling pipe 56, 66, 76 or 86 is accommodated in the cooling plate 8, 68, 78 or 88. The cooling plate 8, 68, 78 or 88 is made from a sheet of metal such copper and aluminum, and is cooled by the cooling pipe 56, 66, 76 or 86 that is accommodated in the cooling plate 8, 68, 78 or 88. The cooling plate 8, 68, 78 or 88 is securely arranged on the bottom surface of the battery block 3 to be thermally coupled to but electrically insulated from the battery block 3. The cooling plate 8, 68, 78 or 88 cools the rectangular batteries 1 from the bottom surface side. A metal sheet is formed into a hollow box shape and is provided with the cooling pipe 56, 66, 76 or 86 inside, and as a result the cooling plate 8, 68, 78 or 88 is manufactured. A thermally-insulating member 9 or a heat conductive member fills the space of the box-shaped cooling plate 8, 68, 78 or 88 that accommodates the cooling pipe 56, 66, 76 or 86 with the parallel piping portions 56A, 66A, 76A or 86A, and as a result the cooling plate 8, 68, 78 or 88 is manufactured. In the case where the cooling pipe 56, 66, 76 or 86 contacts, in other words, is thermally coupled to an upper surface plate portion 8A, 68A, 78A or 88A of the cooling plate 8, 68, 78 or 88 on the battery block 3 side, thermally-insulating member 9 such as glass fiber fills the interior space of the cooling plate 8, 68, 78 or 88. The purpose is for the cooling pipe 56, 66, 76 or 86 to cool the upper surface plate portion 8A, 68A, 78A or 88A. In the case where the cooling pipe does not contact, in other words, is not thermally coupled to the upper surface plate portion, a heat conductive material such as silicon oil fills the interior space of the cooling plate. The purpose is then for the cooling pipe to cool the upper surface plate portion through the heat conductive material. However, a plate may be provided with through holes that extend in parallel to each other inside the plate to accommodate cooling pipes, and the ends of accommodated cooling pipes may be coupled to each other to manufacture the cooling plate. Also, without using cooling pipes to be accommodated in the through holes, the ends of the through holes may be coupled to each other to manufacture the cooling plate. In the battery system in which the cooling pipe 56, 66, 76 or 86 cools the rectangular batteries 1 through the cooling plate 8, 68, 78 or 88, a thermal conduction area between the cooling plate 8, 68, 78 or 88 and the rectangular batteries 1 can be large, and as a result it is possible to efficiently cool the rectangular batteries 1 with the cooling plate 8, 68, 78 or 88. Accordingly, the battery system is configured so that the cooling plate 8, 68, 78 or 88 can be efficiently cooled by the cooling pipe 56, 66, 76 or 86. Therefore, in this configuration, it is possible to efficiently cool the rectangular batteries 1 with the cooling pipe 56, 66, 76 or 86.

In the battery system shown in FIGS. 11 to 13, the parallel piping portions 56A of the cooling pipe 56 that are accommodated in the cooling plate 8 are arranged right under the rectangular batteries 1. The parallel piping portion 56A that are arranged right under each rectangular battery 1 cools the rectangular battery 1 from the bottom side through the cooling plate 8. One of the parallel piping portions 56A of the cooling pipe 56, which is arranged right under one of the rectangular batteries 1, efficiently cools the one of the rectangular batteries 1, which is the closest to the one of the parallel piping portions 56A, and additionally, in this arrangement, the cooling plate 8 diffuses thermal energy to be cooled so that the rectangular batteries 1 are uniformly cooled whereby reducing the temperature difference among the rectangular batteries 1.

In the battery system shown in FIGS. 14 to 16, the parallel piping portions 66A of the cooling pipe 66 that are accommodated in the cooling plate 68 are arranged adjacent rectangular batteries 1. One of the parallel piping portions 66A of the cooling pipe 66 is arranged between adjacent two of the rectangular batteries 1 and cools the adjacent two of the rectangular batteries 1, which are the closest to the one of the parallel piping portions 66A, and additionally, in this arrangement, the cooling plate 68 diffuses thermal energy to be cooled. Accordingly, the rectangular batteries 1 can be uniformly cooled by the parallel piping portions 66A of the cooling pipe 66 to reduce the temperature difference among the rectangular batteries 1.

In the battery systems shown in FIGS. 17 to 22, the parallel piping portions 76A or 86A of the cooling pipe 76 or 86 are accommodated in the cooling plate 78 or 88. The densities of the parallel piping portions 76A or 86A are different between the ends and the middle of the battery block 3. In the battery system shown FIGS. 17 to 19, the parallel piping portions 76A of the cooling pipe 76 that are accommodated in the cooling plate 78 in the middle of the battery block 3 are arranged more tightly than at both ends of the battery block 3. The battery system can more efficiently cool the rectangular batteries 1 in the middle. For this reason, in the case where this arrangement is used in a battery system in which the temperature of the middle of the battery block 3 is likely to rise more greatly, the rectangular batteries 1 can be uniformly cooled. In the battery system shown FIGS. 20 to 22, the parallel piping portions 86A of the cooling pipe 86 at both ends of the battery block 3 are arranged more tightly than in the middle of the battery block 3. The battery system can more efficiently cool rectangular batteries 1 that are arranged at the ends in array alignment. For this reason, in the case where this arrangement is used in a battery system in which the temperature of rectangular batteries at the ends of the battery block 3 are likely to rise higher, the rectangular batteries 1 can be uniformly cooled.

In the battery system shown in FIGS. 23 and 24, the rectangular batteries 91 are put into a sideways position and are arranged in array alignment to form battery units 92, and two battery units 92 are coupled in a straight line to form one line of battery block 93. Each battery unit 92 includes a plurality of the rectangular batteries 91 that are securely arranged in array alignment by the battery holder 94. The battery holder 94 includes a pair of sandwich plates 80 that sandwich the rectangular batteries 91 in array alignment, and coupling members 81 that couple the sandwich plates 80. In this battery system, the cooling pipe 96 or a cooling plate 98 can be arranged on the lower surface, the upper surface or a side surface of the battery block 93 to cool the rectangular batteries 91. The cooling pipe 96 shown in FIGS. 23 and 24 also include a flat part 96a that contacts the rectangular batteries 1.

In the battery system shown in FIGS. 25 to 28, the rectangular batteries 101 are put into a sideways position and are arranged in array alignment to form battery units 102. One line of battery block 103 is composed of two battery units 102 that are coupled in a straight line. Two lines of battery blocks 103 are arranged in parallel to each other. The two lines of battery blocks 103 are arranged so that the bottom surfaces of the rectangular batteries 101 face each other, in other words, so that surfaces of the rectangular batteries 101 with the positive/negative output terminals 105 are located on the left and right sides (in opposed directions). Each battery unit 102 includes a plurality of the rectangular batteries 101 that are securely arranged in array alignment by the battery holder 104. The battery holder 104 includes a pair of sandwich plates 110 that sandwich the rectangular batteries 101 in array alignment, and coupling members 111 that couple the sandwich plates 110. The positive and negative electrode terminals 105 of two battery units 102 that are coupled in a straight line are coupled by a bus bar 115 to be serially connected to each other.

Space is formed between the two lines of battery blocks 103. The cooling pipe 106 or the cooling plate 118 is arranged in the space, and is thermally coupled to side surfaces of the battery blocks 103. In the battery system shown in FIGS. 25 to 27, the cooling pipe 106 is arranged between the two lines of battery blocks 103, and the rectangular batteries 101 are cooled by the cooling pipe 106. As shown in FIG. 27, the cooling pipe 106 is arranged so that both the left and right surfaces of the cooling pipe 106 directly contact the bottom surfaces of the rectangular batteries 101 that are opposed to each other. In other words, the cooling pipe 106 is interposed by the two lines of battery block 103 so that opposed surfaces of the cooling pipe 106 contact the bottom surfaces of the rectangular batteries 101. As shown in FIG. 26, the cooling pipe 106 is also formed by bending a metal tube into a shape that includes the parallel piping portions 106A that are arranged in parallel to each other, and U-bent portions that couple the ends of the parallel piping portions 106A. The parallel piping portions 106A are coplanarly arranged and are thermally coupled to the surfaces of the battery blocks 103 that are arranged on the both sides of the parallel piping portions 106A. Both the left and right surfaces of the cooling pipe 106 contact the bottom surfaces of the rectangular batteries 101 that are opposed to each other to simultaneously cool the rectangular batteries 101 that are located on the both sides. Accordingly, it is possible to efficiently and uniformly cool the rectangular batteries 101 of the two lines of battery block 103.

The cooling pipe 106 shown in FIG. 27 has a circular shape in cross section. However, the cooling pipe may have flat parts in cross section to provide the flat parts with a larger contact area with the surfaces of the rectangular batteries. In the case where the cooling pipe has the flat parts, the cooling pipe can have a rectangular shape or an ellipse shape, and the flat parts can be located on opposed surfaces of the cooling pipe. In this cooling pipe, flat parts that are located on both surfaces contact the surfaces of the rectangular batteries that are located on both sides, and as a result the rectangular batteries on both sides can be efficiently cooled.

In the battery system shown in FIG. 28, the cooling plate 118 is arranged between the two lines of battery blocks 103, and the rectangular batteries 101 are cooled by the cooling plate 118. The cooling plate 118 accommodates the cooling pipe 116. The plate 118 is cooled by the cooling pipe 116. The cooling plate 118 is made from a metal sheet that will be formed into a hollow box shape, and is provided with the cooling pipe 116 inside. The illustrated cooling plate 118 includes a pair of opposed plate portions 118A that are located on the both sides of the cooling pipe 116 and are thermally coupled to the cooling pipe 116. The opposed plate portions 118A contact the surfaces of the rectangular batteries 101. In the illustrated cooling plate 118, the cooling pipe 116 that has parallel piping portions 116A is sandwiched between the pair of opposed plate portions 118A. The interior space of the cooling pipe is filled with thermally-insulating material 9. In the cooling plate 118 that has the opposed plate portions 118A that thus contact the rectangular batteries 101, the heat conduction area between the opposed plate portions 118A and the rectangular batteries 101 can be large, and as a result the rectangular batteries 1 can be efficiently cooled by the cooling plate 118. In the cooling plate 118, the pair of opposed plate portions 118A contact the surfaces of the rectangular batteries 101 that are opposed to each other to simultaneously cool the rectangular batteries 101 that are located on both sides. Accordingly, it is possible to efficiently and uniformly cool the rectangular batteries 101 of the two lines of battery block 103.

Although the cooling pipe 116 shown FIG. 28 has a circular shape in cross section, the cooling pipe may have flat parts in cross section on its opposed sides to provide the flat parts with a larger contact area with the surfaces of the rectangular batteries. For example, the cooling pipe can have a rectangular shape or an ellipse shape in cross section, and the flat parts located on the opposed surfaces can contact the interior surfaces of the pair of opposed plate portions. In this case, the cooling plate can also efficiently cool the rectangular batteries on the both sides through the pair of opposed plate portions that are cooled by the cooling pipe.

In the cooling pipes 206, 226, 236, 246, 256, 266, 276, 286 and 296 shown in FIGS. 29 to 48, the cooling pipe has the serpentine region 206X, 226X, 236X, 246X, 256X, 266X, 276X, 286X or 296X. The serpentine region 206X, 226X, 236X, 246X, 256X, 266X, 276X, 286X or 296X is thermally coupled to the lower surfaces of the battery block 3 or 93. In the serpentine region 206X, 226X, 236X, 246X, 256X, 266X, 276X, 286X or 296X, both ends of a plurality of parallel piping portions 206A, 226A, 236A, 246A, 256A, 266A, 276A, 286A or 296A that are arranged in parallel to each other in the horizontal plane are coupled by the U-bent portions 206B, 226B, 236B, 246B, 256B, 266B, 276B, 286B or 296B. In the cooling pipe 206, 226, 236, 246, 256, 266, 276, 286 or 296, the U-bent portions 206B, 226B, 236B, 246B, 256B, 266B, 276B, 286B or 296B are located on the ends of the lower surface of the battery block 3 or 93. In the illustrated battery systems, pipe parts corresponding to the parallel piping portions 206A, 226A, 236A, 246A, 256A, 266A, 276A, 286A or 296A are arranged orthogonally to the width direction of the rectangular battery 1. The illustrated cooling pipe 206, 226, 236, 246, 256, 266, 276, 286 or 296 is formed by bending one metal tube into a serpentine shape. The metal tube is a copper or aluminum pipe, which has excellent heat conductivity.

In the battery system shown in FIGS. 29 to 31, the serpentine region 206X of the cooling pipe 206 is located on the lower surface of the battery block 3, and is securely arranged to contact the bottom surfaces of the rectangular batteries 1. This cooling pipe 206 effectively cools the rectangular batteries 1 by the serpentine region 206X that directly contacts the rectangular batteries 1. The cooling pipe 206 includes a flat part 206a that is located on the upper surface of the cooling pipe 206. The flat part 206a is securely arranged to contact the bottom surfaces of the rectangular batteries 1 over a large area. Although the illustrated battery system is shaped so that the flat part 206a that extends over the entire cooling pipe 206, the cooling pipe may be shaped so that only the serpentine region has the flat part. In the battery system in which the cooling pipe 206 has the flat part 206a that contacts the rectangular batteries 1, thermal coupling area between the cooling pipe 206 and the rectangular batteries 1 is large. Accordingly, it is possible to efficiently cool the rectangular batteries 1 with the cooling pipe 206. In this case, since the cooling pipe 206 bears the battery block 3 over a large area, the cooling pipe 206 can bear the heavy battery block 3 without being damaged. In particular, also in the state where the battery block 3 is vibrated, the cooling pipe 206 can bear the heavy battery block 3 without being deformed.

In the battery systems shown in FIGS. 32 to 35, the densities of the parallel piping portions 226A or 236A are different between the sides and the middle of each of the battery units 2 that compose the battery block 3. In the battery system shown FIGS. 32 and 33, the parallel piping portions 226A of the cooling pipe 226 at both sides of the battery unit 2 are arranged more tightly than in the middle of the battery unit 2. In this battery system, the side parts of the battery unit 2 are stably and firmly borne by the parallel piping portions 226A that are tightly arranged, and, in addition, the ends of the battery unit 2 are firmly borne by the U-bent portions 226B. In this battery system, the periphery of the battery unit 2 is borne by the U-bent portions 226B and the tightly-arranged parts of the cooling pipe 226 on the side parts firmly, in other words, to prevent cooling pipe 226 deformation. Accordingly, this battery system has a feature in that the heavy battery block can be entirely and sufficiently strongly borne. In addition to this, the side parts of the battery unit 2 can be more efficiently cooled. In the case where this battery system is used in a battery system in which the temperature of the side parts of the battery unit 2 is likely to rise more greatly, the rectangular batteries 1 can be uniformly cooled. The cooling pipe 226 shown in FIGS. 32 and 33 also includes a flat part 226*a* that contacts the rectangular batteries 1.

In the battery system shown FIGS. 34 and 35, the parallel piping portions 236A of the cooling pipe 236 in the middle of the battery unit 2 are arranged more tightly than in the side parts of the battery unit 2. In this battery system, the middle of the battery unit 2 is stably and firmly borne by the parallel piping portions 236A that are tightly arranged, and, in addition, the ends of the battery unit 2 are firmly borne by the U-bent portions 236B. In this battery system, the middle of the battery unit 2 is borne by the U-bent portions 236B and the tightly-arranged part of the cooling pipe 236 in the middle of the battery unit 2 firmly, in other words, to prevent cooling pipe 236 deformation. Accordingly, this battery system has a feature in that the heavy battery block can be entirely and sufficiently strongly borne. In addition to this, the middle of the battery unit 2 can be more efficiently cooled. In the case where this battery system is used in a battery system in which the temperature of the middle of the battery unit 2 is likely to rise higher, the rectangular batteries 1 can be uniformly cooled. The cooling pipe 236 shown in FIGS. 34 and 35 also includes a flat part 236*a* that contacts the rectangular batteries 1.

In the aforementioned thirteenth and fourteenth embodiments, although the densities of the parallel piping portions 226A and 236A are different between the middle and the side parts of the battery unit 2, the densities of the parallel piping portions can be different between the inlet side and the outlet side of the coolant of the cooling pipe. The coolant is circulated through the cooling pipe that cools the battery block to absorb heat from the rectangular batteries. For this reason, the temperature of coolant that flows through the cooling pipe is likely to be higher on the outlet side than the inlet side of the coolant. In other words, the temperature of the coolant that flows through the cooling pipe rises higher by heat generation of batteries closer to the outlet side, and as a result the temperature of the cooled rectangular batteries may be uneven. To eliminate the unevenness, the parallel piping portions on the coolant outlet side are arranged more tightly than the coolant inlet side. This arrangement can efficiently cool the rectangular batteries on the coolant outlet side.

In the battery system shown FIGS. 36 and 37, the parallel piping portions 276A of the cooling pipe 276 on the coolant outlet side are arranged more tightly than in the coolant inlet side. In this battery system since the parallel piping portions 276A are tightly arranged on the coolant outlet side where the temperature of the coolant is likely to be higher, it is possible to efficiently cool the battery block 3 on the coolant outlet side, and as a result it is possible to uniformly cool the entire battery block. The cooling pipe 276 shown in FIGS. 36 and 37 also includes a flat part 276*a* that contacts the rectangular batteries 1.

In the illustrated battery system, the battery block 3 includes two battery units 2, and the two battery units 2 are aligned from the inlet side to the outlet side of the coolant. The parallel piping portions 276A that are arranged in the battery unit 2 on the outlet side of the coolant arranged more tightly than the parallel piping portions 276A that are arranged in the battery unit 2 on the inlet side of the coolant. In this configuration, the tightly-arranged parallel piping portions 276A can efficiently cool the battery unit 2 that is arranged on the coolant outlet side where the temperature of the coolant is likely to rise. Accordingly, there is a feature in that the entire battery block that is composed of a plurality of battery units 2 can be uniformly cooled.

In particular, in the illustrated battery system, in each battery unit 2, the parallel piping portions 276A that are arranged on the coolant outlet side are arranged more tightly than the parallel piping portions 276A that are arranged on the coolant inlet side. Specifically, in the illustrated cooling pipe 276, in a plurality of parallel piping portions 276A that are arranged in the battery unit 2 that is arranged on the coolant inlet side, the parallel piping portions 276A are arranged on the coolant inlet side more loosely than the outlet side. Also, in a plurality of parallel piping portions 276A that are arranged in the battery unit 2 that is arranged on the coolant outlet side, the parallel piping portions 276A on the coolant outlet side are more tightly than the inlet side. The densities are equal between the parallel piping portions 276A on the outlet side of the battery unit 2 that is arranged on the coolant inlet side, and the parallel piping portions 276A on the inlet side of the battery unit 2 that is arranged on the coolant outlet side. This configuration has features in that, in each battery unit 2, the parallel piping portions 276A that are more tightly arranged efficiently cool the outlet side where the temperature of the coolant is likely to rise so that each battery unit 2 is uniformly cooled, and in that, in the entire battery block, the battery unit 2 that is arranged on the coolant outlet side is efficiently cooled so that the entire battery block can be more uniformly cooled. In the illustrated cooling pipe 276, the densities of the parallel piping portions 276A are gradually varied from the coolant inlet side to the outlet side. However, in the cooling pipe, the densities of the parallel piping portions may be increased at a predetermined rate from the coolant inlet side to the outlet side. Also, in the cooling pipe, the average densities of the parallel piping portions that are arranged in the battery units may be adjusted so that the density of the outlet side is higher than the density of the inlet side. That is, the densities of the parallel piping portions that are arranged in each battery unit may have variation. For example, in the battery units that have a part that is likely to locally generate heat, the parallel piping portions are intensively arranged in this local heat generation part to effectively cool the battery units, and the average densities of the parallel piping portions are adjusted over a plurality of battery units as a whole to uniformly cool the entire battery block.

In the battery systems shown in FIGS. 38 to 46, the cooling pipe 246, 256, 266 or 286 is accommodated in the cooling plates 208, 258, 268 or 288. The cooling plate 208, 258, 268 or 288 is made from a sheet of metal such copper and aluminum, and is cooled by the cooling pipe 246, 256, 266 or 286 that is accommodated in the cooling plate 208, 258, 268 or 288. The cooling plate 208, 258, 268 or 288 is securely arranged on the bottom surface of the battery block 3 to be thermally coupled to, but electrically insulated from, the battery block 3. The cooling plate 208, 258, 268 or 288 cools the rectangular batteries 1 from the bottom surface side. A metal sheet is formed into a hollow box shape and is provided with the cooling pipe 246, 256, 266 or 286 inside, and as a result the cooling plate 208, 258, 268 or 288 is manufactured. A thermally-insulating material 9 or a heat conductive material fills the space of the box-shaped cooling plate 208, 258, 268 or 288 that accommodates the serpentine region 246X, 256X, 266X or 286X of the cooling pipe 246, 256, 266 or 286, and as a result the cooling plate 208, 258, 268 or 288 is manufactured. In the case where the cooling pipe 246, 256, 266 or 286 contacts, in other words, is thermally coupled to an upper surface plate portion 208A, 258A, 268A or 288A of the cooling plate 208, 258, 268 or 288 on the battery block 3 side, thermally-insulating member 9 such as glass fiber fills the interior space of the cooling plate 208, 258, 268 or 288. The purpose is that the cooling pipe 246, 256, 266 or 286 cools the upper surface plate portion 208A, 258A, 268 or 288A. In the case where the cooling pipe does not contact, in other words, is not thermally coupled to the upper surface plate portion, a heat conductive material such as silicon oil fills the interior space of the cooling plate. The purpose is that the cooling pipe cools the upper surface plate portion through the heat conductive material.

In the aforementioned battery systems, the cooling pipe 246, 256, 266 or 286 bear the battery block 3 through the upper surface plate portion 208A, 258A, 268A or 288A of the cooling plates 208, 258, 268 or 288. For this reason, the weight of the battery block 3 is not directly applied onto the cooling pipe 246, 256, 266 or 286. The weight of the battery block 3 is borne by both the upper surface plate portion 208A, 258A, 268A or 288A, and the cooling pipe 246, 256, 266 or 286. Accordingly, in the battery system, even in the case where both the upper surface plate portion 208A, 258A, 268A or 288A, and the cooling pipe 246, 256, 266 or 286 is made from a thin metal sheet with small thermal resistance, a large weight of battery block 3 can be borne. In other words, deformation of the cooling pipe 246, 256, 266 or 286 is more effectively prevented, and additionally the upper surface plate portion 208A, 258A, 268A or 288A, and the cooling pipe 246, 256, 266 or 286, which are thin and have small thermal resistance can bear the heavy battery block 3. Accordingly, it is possible to efficiently cool the rectangular batteries 1 with the coolant, and additionally to prevent damage such as deformation of the cooling pipe 246, 256, 266 or 286. That is, in this configuration, since it is not necessary to bear the battery block 3 only with the upper surface plate portion 208A, 258A, 268A or 288A, the upper surface plate portion 208A, 258A, 268A or 288A can be also made from a thin metal sheet with small heat resistance. Since both the upper surface plate portion 208A, 258A, 268A or 288A, and the cooling pipe 246, 256, 266 or 286 can be thin and have small heat resistance, the coolant can efficiently cool the rectangular batteries 1 through the cooling pipe 246, 256, 266 or 286, and the upper surface plate portion 208A, 258A, 268A or 288A. Also, in the battery system, the heat conduction area between the cooling plate 208, 258, 268 or 288, and the rectangular batteries 1 can be large, and as a result the rectangular batteries 1 can be efficiently cooled by the cooling plate 208, 258, 268 or 288. Accordingly, the battery system is configured so that the cooling plates 208, 258, 268 or 288 can be efficiently cooled by the cooling pipe 246, 256, 266 or 286. Therefore, this configuration has a feature in that the rectangular batteries 1 can be efficiently and uniformly cooled by the coolant.

In the battery system shown in FIGS. 39 and 40, the cooling plate 208 accommodates the parallel piping portions 246A in that pipe parts are uniformly spaced. The parallel piping portions 246A in which pipe parts are uniformly spaced uniformly cool the upper surface plate portion 208A of the cooling plate 208 so that all the rectangular batteries 1 are uniformly cooled from the bottom side.

In the battery systems shown in FIGS. 41 to 44, the parallel piping portions 256A or 266A of the cooling pipe 256 or 266 are accommodated in the cooling plate 258 or 268. The densities of the parallel piping portions 256A or 266A are different between side parts and the middle of the battery units 2 that compose the battery block 3. In the battery system shown FIGS. 41 and 42, the parallel piping portions 256A of the cooling pipe 256 in the side parts of the battery unit 2 are arranged more tightly than in the middle of the battery unit 2. In this battery system, the side parts of the battery unit 2 are stably borne by the parallel piping portions 256A that are tightly arranged, and, in addition, the ends of the battery unit 2 are firmly borne by the U-bent portions 256B. In this battery system, the periphery of the battery unit 2 is borne by the U-bent portions 256B and the tightly-arranged parts of the cooling pipe 256 firmly, in other words, to prevent cooling pipe 256 deformation. Accordingly, the heavy battery block can be entirely and sufficiently strongly borne. In addition to this, in this battery system, the side parts of the battery unit 2 can be more efficiently cooled. In the case where this battery system is used in a battery system in which the temperature of the side parts of the battery unit 2 is likely to rise more greatly, the rectangular batteries 1 can be uniformly cooled.

In the battery system shown FIGS. 43 and 44, the parallel piping portions 266A of the cooling pipe 266 that is accommodated in the cooling plate 268 in the middle of the battery unit 2 are arranged more tightly than in the side parts of the battery unit 2. In this battery system, the middle of the battery unit 2 is stably borne by the parallel piping portions 266A that are tightly arranged, and, in addition, the ends of the battery unit 2 are firmly borne by the U-bent portions 266B. In this battery system, the middle of the battery unit 2 is borne by the U-bent portions 266B and the tightly-arranged parts of the cooling pipe 266 firmly, in other words, to prevent cooling pipe 266 deformation. Accordingly, the heavy battery block can be entirely and sufficiently strongly borne. In addition to this, in this battery system, the middle of the battery unit 2 can be more efficiently cooled. In the case where this battery system is used in a battery system in which the temperature of the middle of the battery unit 2 is likely to rise higher, the rectangular batteries 1 can be uniformly cooled.

In the aforementioned seventeenth and eighteenth embodiments, although the densities of the parallel piping portions 256A and 266A of the cooling pipes 256 and 266 that are accommodated in the cooling plates 258 and 268 are different between in the middle and in the side parts of the battery unit 2, the densities of the parallel piping portions of the cooling pipe that is accommodated in the cooling plate can be different between the inlet side and the outlet side of the coolant of the cooling pipe. The temperature of the coolant that flows through the cooling pipe rises higher by heat generation of batteries closer to the outlet side, and as a result the temperature of the cooled rectangular batteries may be uneven. To eliminate the unevenness, the parallel piping portions on the coolant outlet side are arranged more tightly than the coolant inlet side. This arrangement can efficiently cool the rectangular batteries in the coolant outlet side.

In the battery system shown FIGS. 45 and 46, the parallel piping portions 286A of the cooling pipe 286 that are accommodated in the cooling plate 288 are arranged on the coolant outlet side more tightly than the coolant inlet side. In this battery system, the tightly-arranged parallel piping portions 286A can efficiently cool the outlet side where the temperature of the coolant is likely to rise. In the illustrated battery system, the battery block 3 includes two battery units 2, and the two battery units 2 are aligned from the inlet side to the outlet side of the coolant. The parallel piping portions 286A that are arranged in the battery unit 2 on the outlet side of the coolant are arranged more tightly than the parallel piping portions 286A that are arranged in the battery unit 2 in the inlet side of the coolant. In this configuration, it is possible to efficiently cool the battery unit 2 on the coolant outlet side where the temperature of the coolant is likely to rise. Accordingly, there is a feature in that the entire battery block that is composed of a plurality of battery units 2 can be uniformly cooled. The densities of the parallel piping portions 286A of the cooling pipe 286 that is accommodated in the illustrated cooling plate 288 are gradually varied from the coolant inlet side to the outlet side. However, the densities of the parallel piping portions of the cooling pipe may be increased at a predetermined rate from the coolant inlet side to the outlet side. Also, in the cooling pipe that is accommodated in the cooling plate, the average densities of the parallel piping portions that are arranged in the battery units may be adjusted so that the density of the outlet side is higher than the density of the inlet side.

In the battery system shown in FIGS. 47 and 48, the rectangular batteries 91 are put into a sideways position and are arranged in array alignment to form battery units 92, and two battery units 92 are coupled in a straight line to form one line of battery block 93. Each battery unit 92 includes a plurality of the rectangular batteries 91 that are securely arranged in array alignment by the battery holder 94. The battery holder 94 includes a pair of sandwich plates 80 that sandwich the rectangular batteries 91 in array alignment, and coupling members 81 that couple the sandwich plates 80. In this battery system, the serpentine region 296X of the cooling pipe 296 is arranged in the lower surface of the battery block 93 to cool the rectangular batteries 91. The cooling pipe 296 shown in FIGS. 47 and 48 also include a flat part 296*a* that contacts the rectangular batteries 1.

The coolant feeding device 7 or 27 feeds the coolant to the cooling pipe. The coolant can be coolant that cools the cooling pipe by heat of vaporization, or coolant of cooled liquid such as water and oil that cools the cooling pipe. As shown in FIGS. 2, 4, 12, 17, 20, 23, 26, 29, 36, 45 and 47, the coolant feeding device 7 that feeds the coolant for cooling the cooling pipe by heat of evaporation includes a compressor 12 that pressurizes gaseous coolant that is discharged from the cooling pipe 6, 26, 56, 76, 86, 96, 106, 206, 276, 286 or 296, a condenser 13 that cools and liquefies the gaseous coolant that is pressurized by the compressor 12, an expansion valve 14 that feeds the coolant that is liquefied by the condenser 13 to the parallel piping portions 6A, 26A, 56A, 76A, 86A, 96A, 106A, 206A, 276A, 286A or 296A of the cooling pipe 6, 26, 56, 76, 86, 96, 106, 206, 276, 286 or 296. The coolant feeding device 7 evaporates the coolant that is fed through the expansion valve 14 in the parallel piping portions 6A, 26A, 56A, 76A, 86A, 96A, 106A, 206A, 276A, 286A or 296A so that the parallel piping portions 6A, 26A, 56A, 76A, 86A, 96A, 106A, 206A, 276A, 286A or 296A is cooled by large heat of evaporation. Accordingly, the parallel piping portions 6A, 26A, 56A, 76A, 86A, 96A, 106A, 206A, 276A, 286A or 296A of the cooling pipe 6, 26, 56, 76, 86, 96, 106, 206, 276, 286 or 296 can be efficiently cooled to low temperature.

As shown in FIGS. 14 and 38, the coolant feeding device 27 uses cooled water or oil as the coolant and includes a circulating pump 22 that circulates the coolant such as water or oil, and a heat exchanger 23 that cools the coolant that is circulated by the circulating pump 22. The circulating pump 22 circulates the coolant through the cooling pipe 66 or 246 and the heat exchanger 23. The heat exchanger 23 cools the circulated coolant. The heat exchanger 23 cools the coolant, for example, by forcedly blowing cooling air. Alternatively, the heat exchanger 23 is immersed in cooling fluid 24 so that the coolant is cooled by the cooling fluid 24.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2007-308092 filed in Japan on Nov. 28, 2007, and No. 2007-308998 filed in Japan on Nov. 29, 2007, the contents of which are incorporated herein by reference.

What is claimed is:

1. A battery system comprising:
    a battery block that includes a plurality of rectangular batteries that have a width greater than their thickness and that are arranged in alignment in an array by a battery holder;
    a coolant pipe that cools said rectangular batteries of said battery block; and
    a coolant feeding device that feeds coolant to circulate through said cooling pipe;
    wherein said cooling pipe is arranged on a surface of said battery block in a thermally-coupled state so that said rectangular batteries are cooled by the coolant which is circulated through said cooling pipe;
    wherein said battery block has end parts and a middle part between said end parts on said surface, said coolant pipe extending along said surface through one of said end parts, through said middle part and through the other of said end parts;
    wherein said cooling pipe has a plurality of parallel piping portions that are arranged in parallel to said rectangular batteries and cool said rectangular batteries, including first said parallel piping portions at said middle part, second said parallel piping portions at the one of said end parts and third said parallel piping portions at the other of said end parts; and
    wherein each of said parallel piping portions of said cooling pipe are parallel with each other and said parallel piping portions are spaced from adjacent ones said parallel piping portions by gaps that are different in width for the first said parallel piping portions at said middle part of said battery block than for the second and third said parallel piping portions at said end parts of said battery block.

2. The battery system of claim 1, wherein said parallel piping portions of said cooling pipe are arranged on a first surface of said battery block so as to extend directly underneath said rectangular batteries and said battery block has electrode terminals on another surface thereof.

3. The battery system of claim 1, wherein adjacent said rectangular batteries of said battery block form a boundary line therebetween so that a plurality of boundary lines are present on said surface of said battery block, and wherein said parallel piping portions of said cooling pipe are arranged on said surface of said battery block so as to extend along said boundary lines and to contact adjacent said rectangular batteries.

4. The battery system of claim 1, wherein said parallel piping portions are arranged at a greater density at said middle part than at said end parts of said battery block.

5. The battery system of claim 1, wherein said parallel piping portions are arranged at a lower density at said middle part than at said end parts of said battery block.

6. The battery system of claim 1, wherein said cooling pipe is arranged so as to directly contact said rectangular batteries.

7. The battery system of claim 1, wherein said parallel piping portions of said cooling part have flat parts as seen in cross-section, said flat parts being thermally coupled to said rectangular batteries.

8. The battery system of claim 1, wherein said battery block is a first battery block and said battery system further comprises a second battery block having a plurality of rectangular batteries that have a width greater than their thickness and that are arranged in alignment in an array by a battery holder, said first and second battery blocks arranged so as to comprise two lines of batteries with said cooling pipe arranged between said battery blocks and said two lines of batteries.

9. The battery system of claim 1, wherein said cooling pipe includes a serpentine region that includes said plurality of parallel piping portions and U-bent portions that couple ends of said plurality of parallel piping portions, said serpentine region is arranged on a first surface of said battery block, electrode terminals are provided on another surface of said battery block, and said U-bent portions are arranged in a peripheral region of said first surface of said battery block.

10. The battery system of claim 9, wherein said parallel piping portions are arranged at a greater density at a coolant outlet side of said cooling pipe than at a cooling inlet side of said cooling pipe.

11. The battery system of claim 9, wherein said battery block comprises a plurality of battery units that are aligned from a coolant inlet side of said cooling pipe to a coolant outlet side of said cooling pipe, and wherein said parallel piping portions of said cooling pipe are arranged at a greater density at one of said battery units at the coolant outlet side of said cooling pipe than at another of said battery units at the cooling inlet side of said cooling pipe.

12. The battery system of claim, wherein said battery system is an electric vehicle power supply.

13. The battery system of claim 1, wherein said battery system is a hybrid car power supply.

14. The battery system of claim 1, wherein said rectangular batteries are lithium-ion rechargeable batteries.

15. The battery system of claim 1, wherein said rectangular batteries are nickel-hydrogen batteries.

16. The battery system of claim 1, wherein said battery holder is fixed with respect to said rectangular batteries such that said rectangular batteries are arranged in plurality of rows and each of said plurality of rows has said rectangular batteries thereof in stacked alignment in an array.

17. The battery system of claim 1, wherein each of said rectangular batteries comprises an exterior case made of metal, wherein said cooling pipe is made of metal, and wherein an electrically insulating material is provided between said cooling pipe and said rectangular batteries so that said exterior case of each of said rectangular batteries and said cooling pipe are electrically insulated from each other.

18. The battery system of claim 1, wherein said cooling pipe is an aluminum pipe.

19. The battery system of claim 1, wherein said cooling pipe is a copper pipe.

* * * * *